(12) United States Patent
Liu et al.

(10) Patent No.: US 7,970,872 B2
(45) Date of Patent: Jun. 28, 2011

(54) INFRASTRUCTURE FOR PARALLEL PROGRAMMING OF CLUSTERS OF MACHINES

(75) Inventors: Huan Liu, Sunnyvale, CA (US); Dan Orban, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 209 days.

(21) Appl. No.: 12/267,142

(22) Filed: Nov. 7, 2008

(65) Prior Publication Data

US 2009/0089560 A1    Apr. 2, 2009

Related U.S. Application Data

(63) Continuation-in-part of application No. 11/906,293, filed on Oct. 1, 2007, now Pat. No. 7,917,574.

(51) Int. Cl.
*G06F 15/173* (2006.01)

(52) U.S. Cl. ........... 709/220; 709/224; 709/228; 725/25

(58) Field of Classification Search .................. 709/220, 709/224, 227, 232, 228; 725/95
See application file for complete search history.

(56) References Cited

U.S. PATENT DOCUMENTS

| | | | |
|---|---|---|---|
| 5,515,531 A | 5/1996 | Fujiwara | |
| 6,081,801 A | 6/2000 | Cochrane et al. | |
| 6,567,806 B1 | 5/2003 | Tsuchida | |
| 7,525,457 B2 * | 4/2009 | Gilson | 341/55 |
| 7,668,970 B2 * | 2/2010 | Blumrich et al. | 709/238 |
| 2002/0038300 A1 | 3/2002 | Iwata | |
| 2003/0037337 A1 * | 2/2003 | Yona et al. | 725/95 |
| 2004/0098359 A1 | 5/2004 | Bayliss | |
| 2005/0098655 A1 | 10/2005 | Datallegro | |
| 2005/0246323 A1 | 11/2005 | Becher | |
| 2007/0150858 A1 * | 6/2007 | Gilson | 717/106 |
| 2007/0174290 A1 | 7/2007 | Narang | |
| 2007/0179927 A1 * | 8/2007 | Vaidyanathan et al. | 707/1 |
| 2009/0089560 A1 * | 4/2009 | Liu et al. | 712/226 |
| 2010/0125574 A1 * | 5/2010 | Navas | 707/722 |

OTHER PUBLICATIONS

European Search Report dated May 27, 2009 for co-pending EPO Application No. 08253196.3-1243.
"GridBatch: Cloud Computing for Large-Scale Data-Intensive Batch Applications" Liu, et al. Accenture Technology Labs 2008 IEEE pp. 295-305.

* cited by examiner

*Primary Examiner* — Khanh Q Dinh

(57) ABSTRACT

GridBatch provides an infrastructure framework that hides the complexities and burdens of developing logic and programming application that implement detail parallelized computations from programmers. A programmer may use GridBatch to implement parallelized computational operations that minimize network bandwidth requirements, and efficiently partition and coordinate computational processing in a multiprocessor configuration. GridBatch provides an effective and lightweight approach to rapidly build parallelized applications using economically viable multiprocessor configurations that achieve the highest performance results.

25 Claims, 14 Drawing Sheets

INFRASTRUCTURE FOR PARALLEL PROGRAMMING OF CLUSTERS OF MACHINES

CROSS REFERENCE TO RELATED APPLICATIONS

This application is a continuation in part of U.S. patent application Ser. No. 11/906,293, filed Oct. 1, 2007, now U.S. Pat. No. 7,917,574 which is incorporated herein by reference in its entirety.

BACKGROUND OF THE INVENTION

1. Technical Field

This disclosure concerns a system and method for parallelizing applications by using a software library of operators designed to implement detail parallelized computation plans. In particular, this disclosure relates to an efficient and cost effective way to implement parallelized applications.

2. Background Information

Currently a large disparity exists between the amount of data organizations need to process at any given time and the computing power available to the organization using single CPU (uniprocessors) systems. Today, organizations use applications that process terabytes and even petabytes of data in order to derive valuable information and business insight. Unfortunately, many of the applications typically run sequentially on uniprocessor machines, and require hours and even days of computation time to produce useable results. The gap between the amount of data that organizations must process and the computational performance of uniprocessors available to the organizations continues to widen. The amount of data collected and processed by organizations continues to grow exponentially. Organizations must address enterprise database growth rates of roughly 125% year over year or equivalent to doubling in size every 10 months. The volume of data for other data rich industries also continue to grow exponentially. For example, Astronomy has a data doubling rate of every 12 months, every 9 months for Bio-Sequences, and every 6 months for Functional Genomics.

Although storage capacity continues to grow at an exponential rate, the speed of uniprocessors no longer grows exponentially. Accordingly, even though organizations may have the ability to continue to increase data storage capacity, computational performance of uniprocessor configurations can no longer keep pace. Organizations must identify a technical solution to address the diverging trends of storage capacity and uniprocessors performance.

In order to process large amounts of data, applications need large amounts of computing power and high I/O throughput. Programmers face the technical challenges of identifying efficient ways to partition computational processing and coordinate computing across multiple CPUs to address the growing gap between the demand and supply of computing power. Given the reality of limited network bandwidth availability, programmers also face the technical challenge of addressing the large bandwidth requirements needed to deliver vast amounts of data to multiple CPUs performing parallel processing computations. Merely introducing an additional machine to a processing pool (configuration) does not increase the overall network bandwidth of the configuration. Although, the local disk I/O bandwidth may increase as a result. A network topology maybe represented as a tree that has many branches that represent network segments and leaves that represent processors. Accordingly, a single bottleneck along any one network segment may determine the overall network capacity and bandwidth of a configuration. In order to scale bandwidth, efficient use of local disk I/O bandwidth increases must be leveraged.

The extraordinary technical challenges associated with parallelizing computational operations include parallel programming complexity, adequate development and testing tools, network bandwidth scalability limits, the diverging trends of storage capacity and uniprocessors performance, and efficient partitioning of computational processing and coordination in multiprocessor configurations.

A need has long existed for a system and method that economically, efficiently implements parallel computing solutions and effectively relieves the burden of developing complex parallel programs by programmers.

SUMMARY

GridBatch provides an infrastructure framework that programmers can use to easily convert a high-level design into a parallelized computational implementation. The programmer analyzes the parallelization potential of computations in an application, decomposes the computations into discrete components and considers a data partitioning plan to achieve the highest performance. GridBatch implements the detailed parallelized computational plan developed by the programmer without requiring the programmer to create low level logic to carryout the execution of the computations. GridBatch provides a library of "operators" (a primitive for data set manipulation) as building blocks to implement the parallelization. GridBatch hides all the complexity associated with parallel programming in the GridBatch library so that the programmer only needs to understand how to apply the operators to correctly implement the parallelization.

Although GridBatch can support many types of applications, GridBatch provides a particular benefit to programmers focused on deploying analytics applications, because of the unique characteristics of analytics applications and the computational operators used by analytics applications. Programmers often write analytics applications to collect statistics from a large data set, such as how often a particular event occurs. The computational requirements of analytics applications often involve correlating data from two or more different data sets (e.g., the computational demands imposed by a table join expressed in a SQL statement).

GridBatch leverages data localization techniques to efficiently manage disk I/O and effectively scale system bandwidth requirements. In other words, GridBatch partitions computational processing and coordinates computing across multiple processors so that processors perform computations on local data. GridBatch minimizes the amounts of data transmitted to multiple processors to perform parallel processing computations.

GridBatch solves the technical problems associated with parallelizing computational operations by hiding parallel programming complexities, leveraging localized data to minimize network bandwidth requirements, and managing the partitioning of computational processing and coordination among multiprocessor configurations.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1:
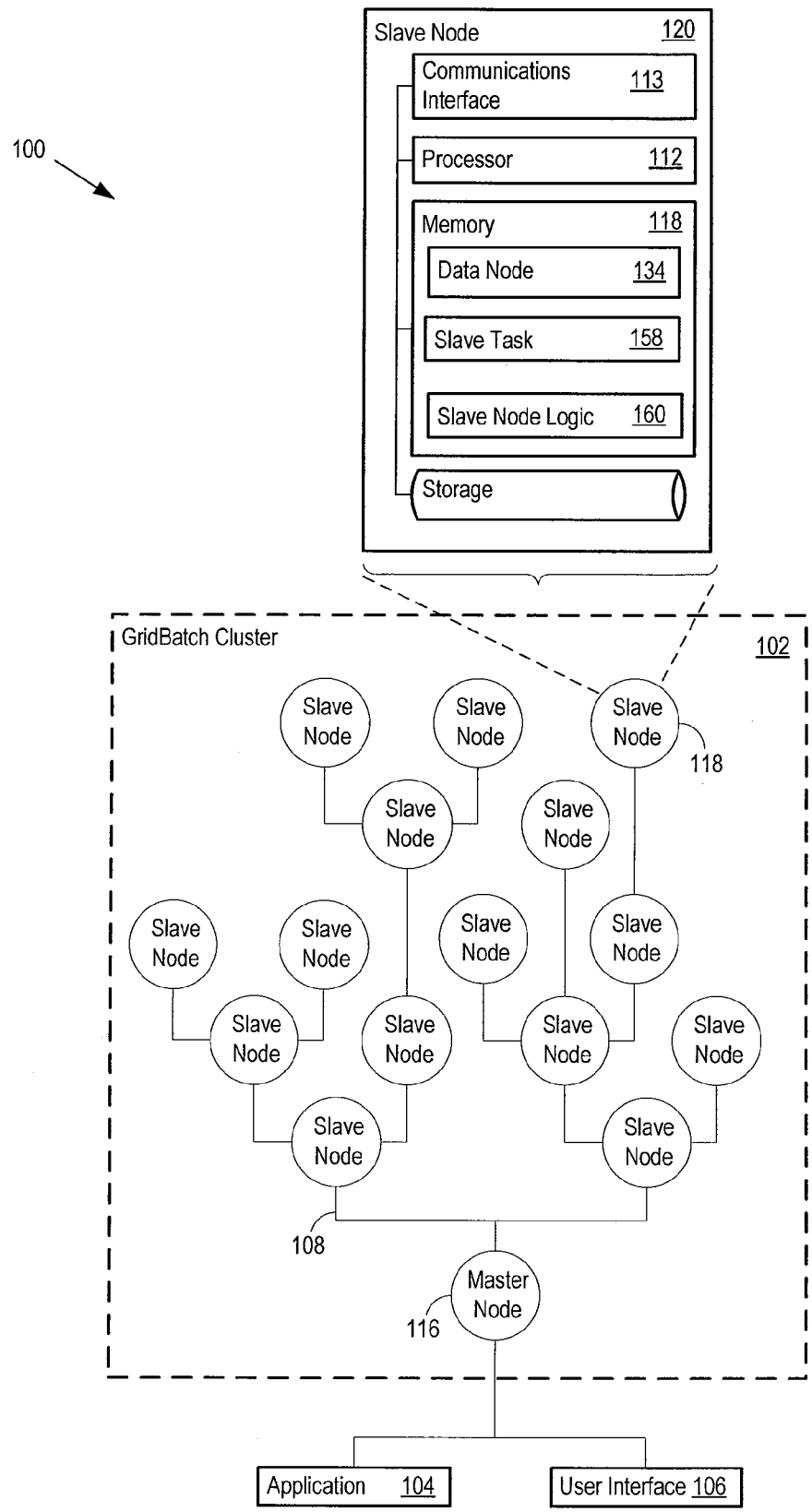
FIG. 1 illustrates the GridBatch system configuration.

Earlier research on parallel computing focused on automatically detecting parallelism in a sequential application. For example, engineers developed techniques in computer architecture, such as out-of-order buffers, designed to detect dependencies among instructions and schedule independent instructions in parallel. Such techniques only examine code fragments coded in a sequential programming language and cannot exploit application-level parallelism. Accordingly, such techniques limit the amount of parallelism that can be exploited.

A large class of applications, in particular data-intensive batch applications, possess obvious parallelism at the data level. However, several technical challenges exist to implementing parallel applications. Programmers must address nontrivial issues relating to communications, coordination and synchronization between machines and processors when the programmers design a parallelized application. In stark contrast to sequential programs, programmers must anticipate all the possible interactions between all the machines in the configuration of a parallelized program, given the inherent asynchronous nature of parallel programs. Also, effective debugging tools for parallelized application and configuration development do not exist. For example, stepping through some code maybe difficult to perform in an environment where the configuration has many threads running on many machines. Also, because of the complex interactions that result in parallelized applications, programmers identify many of the bugs observed as transient in nature and difficult to reproduce. The technical challenges faced by programmers implementing parallelized applications translate directly into higher development costs and longer development cycles. In addition, often programmers cannot migrate or replicate a parallelized solution to other implementations.

Programmers recognize databases systems as well suited for the analytics applications. Unfortunately, database systems do not scale for large data sets for at least two reasons. First, databases systems present a high level SQL (Structured Query Language) with the goal of hiding the implementation details. Although SQL maybe relatively easy to use, the nature of such a high level language forces users to express computations in a way that results in processing that performs inefficiently from a parallelization perspective. In contrast to programming in a lower level language (e.g., C++) where the parallelized processing only reads a data set once, the same processing expressed in SQL may result in several reads being performed. Even though techniques have been developed to automatically optimize query processing, the performance realized by using a lower level language to implement a parallelized computation still far exceeds the performance of the higher level language such as SQL. Second, the I/O architecture of databases systems limits the scalability of distributed parallelized implementations because databases assume that data access to be via a common logical storage unit on the network, either through a distributed file system or SAN (storage area network) hardware. Databases do not leverage logical to physical mappings of data and therefore, do not take advantage of data locality or the physical location of data. Even though sophisticated caching mechanisms exist, databases often access data by traversing the network unnecessarily and consuming precious network bandwidth.

Analytics applications differ from web applications in several regards. Analytics applications typically process structured data, whereas, web applications frequently deal with unstructured data. Analytics applications often require cross referencing information from different sources (e.g., different database tables). Analytics applications typically focus on much fewer statistics than web applications. For example, a word counting application would require statistics for all words in a vocabulary, whereas, an analytics application may be only interested in the number of products sold.

GridBatch provides fundamental operators that may be employed for analytics or other applications. A detailed parallelized application implementation may be expressed as a combination of basic operators provided by GridBatch. GridBatch saves the programmer considerable time related to implementing and debugging because GridBatch addresses the parallel programming aspects for the programmer. Using GridBatch, the programmer determines the combination of operators desired, the sequence operators, and minimal programming to deploy each operator.

Although specific components of GridBatch will be described, methods, systems, and articles of manufacture consistent with GridBatch may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

One example is described below in which a web based retailer sells computer equipment such as PCs and printers. The retailer uses several tables requiring terabytes of storage to track volumes of data and information that can be used to derive analytics information using several tables including: transaction table; customer table; and distributor table. The transaction table stores the records for the product id of each item sold and the customer id of the purchaser. The customer table stores customer information for every customer, and the distributor table stores information regarding every distributor doing business with the retailer. The retailer may use GridBatch to analyze many analytics, some of the analytics include simple counting statistics (e.g., how many of a particular product have been sold and identify the top 10 revenue producing customers). The retailer may use GridBatch to analyze more complicated analytics that involve multiple tables and complex computations. For example, the retailer may use GridBatch to determine the number of customers located in geographical proximity to one of distribution facilities of the retailer in order to measure the efficiency of the distribution network.

The GridBatch infrastructure runs on a cluster of processing nodes ("nodes"). Two software components run in the GridBatch cluster environment named the file system manager and the job scheduler. The file system manager manages files and stores files across all computation nodes in the cluster. The file system manager may segment a large file into smaller chunks and store each chunk on separate nodes. Among all nodes in the cluster, GridBatch may designate, for example, one node to serve as the name node and all other nodes serve as data nodes.

A data node holds a chunk of a large file. In one implementation, depending on the number of nodes in the cluster and other configuration considerations, a data node may hold more than one chunk of a large file. A data node responds to client requests to read from and write to chunks assigned to the data node. The name node holds the name space for the file system. The name node maintains the mapping of a large file to the list of chunks, the data nodes assigned to each chunk, and the physical and logical location of each data node. The name node also responds to queries from clients request the location of a file and allocates chunks of large files to data nodes. In one implementation, GridBatch references nodes by the IP addresses of the nodes, so that GridBatch can access nodes directly. The master node also maintains a physical network topology which keeps track of which nodes are directly connected. The physical network topology may be populated manually by an administrator and/or discovered through an automated topology discovery algorithm. The network topology information may improve the performance of the recurse operator by indicating nearby neighbour slave nodes where intermediate results can be sent and/or retrieved in order to reduce network bandwidth consumption. A brief description of the topology and its use in facilitating execution of the recurse operator will be discussed below.

The GridBatch file system distributes large files across many nodes and informs the job scheduler of the location of each chunk so that the job scheduler can schedule tasks on the nodes that host the chunks to be processed. GridBatch targets large-scale data analysis problems, such as data warehousing, where a large amount of structured data needs to be processed. A file typically stores a large collection of data records that have identical schema (e.g., object owner, or structure, or family of objects). For structured data, GridBatch uses data partitioning to segment data into smaller pieces, similar to database partitioning. GridBatch file system stores files in a fixed number of chunks, each chunk having a chunk id (CID). A programmer may access any chunk, independent of other chunks in the file system.

In one implementation, the programmer may specify the number of chunks that GridBatch can assign. In another implementation, a GridBatch administrator specifies the number of chunks GridBatch can assign, and/or GridBatch determines the number of chunks GridBatch can assign based on the number of nodes available and/or other system configuration resource considerations. In one implementation, the GridBatch file system sets the highest assignable CID to be much larger than N, the number of nodes in the cluster. GridBatch employs a system level lookup table to prescribe the mapping from CID to N translation. The translation provides support for dynamic change of the cluster size such that when the configuration decommissions nodes and additional nodes join the cluster, the GridBatch file system can automatically re-balance the storage and workload. In other words, the file system maintains a mapping of CID to data node, and moves data automatically to different nodes when the CID to data node mapping changes (e.g., when a data nodes joins and/or leaves the GridBatch cluster 102).

In one implementation, GridBatch processes two kinds of data sets: vector and indexed vector. Similar to records of a database table, a vector includes a set of records that GridBatch considers to be independent of each other. The records in a vector may follow the same schema, and each record may include several fields (similar to database columns). In contrast to a vector, but similar to an indexed database table, each record in an indexed vector also has an associated index. For example, one of the fields of the record in the indexed vector could be the associated index of the indexed vector and the index can be of any data type (e.g., string or integer).

When using indexed vectors, the programmer defines how data should be partitioned across chunks through a partition function. When a new data record needs to be written, the file system calls the partition function to determine the chunk id and appends the new data record to the end of the chunk corresponding to the chunk id. In one implementation, the user-defined partition function takes the form: int[ ] partitionFunc (index X) where X represents the index for the record to be written and int[ ] indicates an array of integers. The partition function applies a hash function to convert the index into one or more integers in the range of 1 to CID that indicate the assigned chunk id(s) where the data record should be stored. In another implementation, the partition function may take the form: int[ ] partitionFunc (distributionkey X) where X represents the distribution key indicator for the record to be written to indicate a preferred processor and/or set of processors to use. When using vectors, the GridBatch file system may write each new record to a randomly chosen chunk.

In one implementation, when a user requests a new file for a new indexed vector to be created, the user provides the file system manager a user-defined hash function, which has the form of int[ ] hashFunc(distributionkey X). The hash function accepts a distribution key as input, and produces one or more integers in the range of 1 to CID. When a new record is written, the file system manager invokes the hash function to determine which partition to write the new record. As a result, GridBatch partitions the index vector as new records are processed by the file system manager.

The job scheduling system includes a master node and multiple slave nodes. The master node may use master node logic to implement the master node functionality. A slave node manages the execution of a task assigned to the slave node by the master node. The master node may use the master node logic to break down a job (e.g., a computation) into many smaller tasks as expressed in a program by a programmer. In one implementation, the master node logic distributes the tasks across the slave nodes in the cluster, and monitors the tasks to make sure all of the tasks complete successfully. In one implementation, GridBatch designates data nodes as slave nodes. Accordingly, when the master node schedules a task, the master node can schedule the task on the node that also holds the chunk of data to be processed. GridBatch increases computational performance by reducing network bandwidth dependencies because GridBatch minimizes data transfers and performs data processing on data local to the nodes.

GridBatch provides a set of commonly used primitives called operators that the programmer can use to implement computational parallelization. The operators handle the details of distributing the work to multiple nodes, thus the programmer avoids the burden of addressing the complex issues associated with implementing a parallel programming solution. The programmer introduces a set of operators into a program, in the same fashion as writing a traditional sequential program.

GridBatch provides five operators: distribute, join, convolution, recurse, map. The distribute operator converts a source vector or a source indexed vector to destination indexed vector with a destination index. The conversion involves transferring data from a source data node to a destination data node. The distribute operator takes the following form: Vector Distribute (vector V, Func newPartitionFunc) where V represents the vector where the data to be converted resides and newPartitionFunc represents the partition function that indicates the destination data node where GridBatch will generate a new vector. In one implementation, the user-defined partition function takes the form int[ ] newPartitionFunc(index X), where X represents the index of the record, and int[ ] denotes an array of integers. The user-defined partition function returns a list of numbers corresponding to the list of destination data nodes. In one implementation, the distribute operator may duplicate a vector on all nodes, so that each node has an exact copy for convenient local processing. Duplication of the vector on all nodes may result when the newPartitionFunc returns a list of all the data nodes as destination nodes.

The Join operator takes two indexed vectors and merges the corresponding records where the indexed field matches. GridBatch identifies the corresponding records that have a matching index and invokes a user-defined join function. The user-defined join function may simply merge the two records (e.g., similar to a database join), but generally may implement any desired function. The join operator takes the following form: Vector Join (Vector X, Vector Y, Func joinFunc) where X and Y represent the indexed vectors to be joined and joinFunc represents the user-defined join function to apply to the corresponding records in the indexed vectors. The join operator produces a new vector that includes the results of applying the user-defined function. The user-defined join function takes the following form: Record joinFunc (Record Z, Record K) where Z and K represent a record of vector X and Y, respectively. When GridBatch invokes the user-defined function, GridBatch may guarantee that the indexes for record Z and K match.

GridBatch may perform a distribute operation before performing the join operation so that GridBatch partitions vector X and Y using the partition function on the same index field that the Join will subsequently use. The join operator performs the join on each node locally without determining whether GridBatch has distributed or fetched data to each node. In one implementation, the join operator automatically performs the distribute operator before performing the join.

The join operator may be used when an exact match exists on the index field. However, when a programmer desires to identify the inverse result of the Join operator (e.g., identifying non-matching records), every record Z is checked against every record K. The convolution operator identifies matching Z and K records and applies a user-defined function to each match. The convolution operator provides additional capability and provides more computational options to the programmer. In one implementation, all the computational operations that involve two vectors can be accomplished through the convolution operator. The convolution operator can perform the join function on non-indexed vectors and indexed vectors using any vector field, even when the join uses a non-indexed field for the join. The convolution operator takes the following form: vector Convolution (vector X, vector Y, func convFunc) where X and Y represent the two input vectors, and convFunc represents the user-defined convolution function provided by the programmer. The convolution operator produces a new vector as a result. The user-defined function takes the following form: Record convFunc (record Z, record K) where Z and K represent a record of vector X and Y, respectively. The convFunc function determines whether any action should be taken (e.g., determines whether record Z matches record K) and then performs the corresponding action.

GridBatch may perform a distribute operator before performing the convolution operator so that GridBatch partitions vector X and Y on the same index field that the convolution may subsequently use. The convolution operator performs the computation on each node locally without determining whether GridBatch has distributed or fetched data to each node. In other implementations, the convolution operator automatically performs the distribute operator before performing the convolution.

As one example, a programmer may desire to determine the number of customers located in close proximity to the distributors of a retailer. The GridBatch file system would generate a customer vector that includes a physical location field that indicates the physical location of each customer, and a distributor vector that includes a physical location field that indicates the physical location of each distributor. The programmer may use GridBatch to merge the customer vector and distributor vector based on the physical location field of both vectors. The programmer may use the convFunc to evaluate the physical distance between each customer and each distributor based on the proximity specified by the programmer, and store each record meeting the specified proximity in a results vector.

In one implementation, the GridBatch recurse operator performs a reduce operation, which takes all records of a vector and merges them into a single result. The actual logical operation performed on the records of the vector is defined by a user-specified function. Addition is an example of the reduce operation where all records of a vector are added together. Sorting another example of the reduce operation where all the records of a vector are checked against each other to produce a desired sequence. The recurse operator spreads the reduce operation across many nodes. Web applications often perform frequent reduce operations (e.g., word count, where each word requires a reduce operation to add up the number of appearances), in contrast to most analytics applications which perform few reduce operations. The reduce operator of most analytics applications becomes a bottleneck and limit the scalability of an application when a programmer merely needs sorted output for reporting or a few statistics. Many reduce operations exhibit commutative and associative properties, and may be performed order independently.

For example, counting the number of occurrences of an event involves the commutative and associative operator known as addition. The order in which the addition occurs does not affect the end result. Similarly, sorting may be order independent. GridBatch recurse operator performs order independent reduce operations and takes the following form: Record Recurse (Vector X, Func recurseFunc) where X represents the input vector to reduce and recurseFunc represents the user-defined recurse function to apply. The recurse operator merges the vector into a single record. The user-defined function recurseFunc takes the following form: Record recurseFunc (Record Z1, Record Z2) where Z1 and Z2 represent partial results from merges of two subparts of vector X. The recurseFunc function specifies how to further merge the two partial results.

For example, where vector X represents a vector of integers and the programmer desires to compute the sum of the integers then the programmer will use the addition function as the user-defined recurseFunc function expressed: Record addition(Record Z1, Record Z2){return new Record(Z1.value( )+Z2.value( ));}. GridBatch will apply the addition function recursively over the records of vector X to eventually compute the sum total of the integers in the vector.

In another example, vector X includes records that represent sorted lists of strings and the programmer desires to sort the strings for final reporting. Table 1 illustrates how GridBatch may implement the user-defined function for sorting the strings. The user-defined function merges two sorted list of strings into one sorted string and when the programmer implements the user-defined function to be called recursively, the user-defined function implements the merge sort algorithm.

TABLE 1

User-Defined Function for Sorting.

```
Record mergeSort (Record Z1, Record Z2)
  { new Record Z;
  // next string from record Z1
  String a = Z1.next( );
  // next string from record Z2
  String b = Z2.next( );
  do {
    if ( a < b ) {
        Z.append(a);
        a = Z1.next( );
    }
    else {
        Z.append(b);
        b = Z2.next( );
    }
  } while ( !Z1.empty ( ) &&
            !Z2.empty( ) );
  return x;
}
```

Recurse parallelizes the reduce operation over many nodes. In addition, Recurse minimizes network traffic for operations that need partial results. For example, where a programmer needs to identify the top 10 revenue producing customers, each node computes the local top 10 customers and forwards the results (e.g., partial results) to neighbouring nodes that in turn merge the partial results with the local result of the receiving node to produce the top 10. Each node only passes the top 10 records to particular neighbouring nodes, rather than passing every record of each node to a single node performing the reduce operation. Accordingly, the recurse operator avoids large bandwidth requirements and undesired network traffic, and provides higher computational performance.

The map operator applies a user-defined map function to all records of a vector. The map operator takes the following form: Vector Map(vector V, Func mapFunc) where V represents the vector, more specifically the records of the vector, to which the mapFunc will be applied. The user-defined map function may take the following form: Record mapFunc (Record X). The user-defined function, mapFunc, accepts one record of the input vector as an argument and produces a new record for the result vector.

The block operator leverages parallelism at the block level by applying a user-defined bloFunc function to the records of a vector chunk. The block operator takes the following form: Vector BLO(vector X, Func bloFunc) where X is an input vector and bloFunc is a user-defined function. The user-defined function bloFunc may take the following form: bloFunc (Iterator records). The user-defined function, bloFunc, accepts a list of records (e.g., Iterator) as arguments to which the user-defined function is applied. The records in the list of records are for a given partition (e.g., vector chunk). The bloFunc may return the records of vector X in the same order as the order in which the records were written to the partition (e.g., vector chunk) so that an ordered sequence (e.g., rank) can be determined for the records of the partition. The user-defined bloFunc function is applied to the list of records in the input Iterator to obtain a block function evaluation record for a new Vector Z.

In one implementation, GridBatch tolerates slave node failures and errors by re-executing tasks when slave nodes fail to complete tasks. Each vector chunk of a vector is duplicated X times on X different slave nodes designated backup nodes, where X is a constant that may be specified by the user and/or determined by GridBatch based on the configuration, available resources and/or historical observations. During the computation of any operator, if a slave node fails before the slave node completes the assigned task, the master node is informed and the master node starts another process on a slave node that holds a backup copy of the vector chunk. The master node identifies a slave node as a failed slave node when the master node does not receive a periodic heartbeat from the slave node.

FIG. 1 illustrates the GridBatch system configuration 100 (GridBatch) that includes a GridBatch cluster 102, an application 104 and user interface 106. GridBatch 100 components communicate through a network 108 (e.g., the internet, a local area network, wide area network, or any other network). GridBatch cluster 102 includes multiple nodes (e.g., master node 116 and slave node 120). Each slave node 120 may include a communications interface 113 and memory 118. GridBatch 100 designates a master node 116, and the remaining nodes slave nodes (e.g., slave node 120). GridBatch 100 may designate slave nodes as data nodes (e.g., data node 134), described further below. The slave node 120 uses slave node logic 160 to manage the execution of slave tasks 158 assigned to the slave node 120 by the master node 116.

Figure 2:
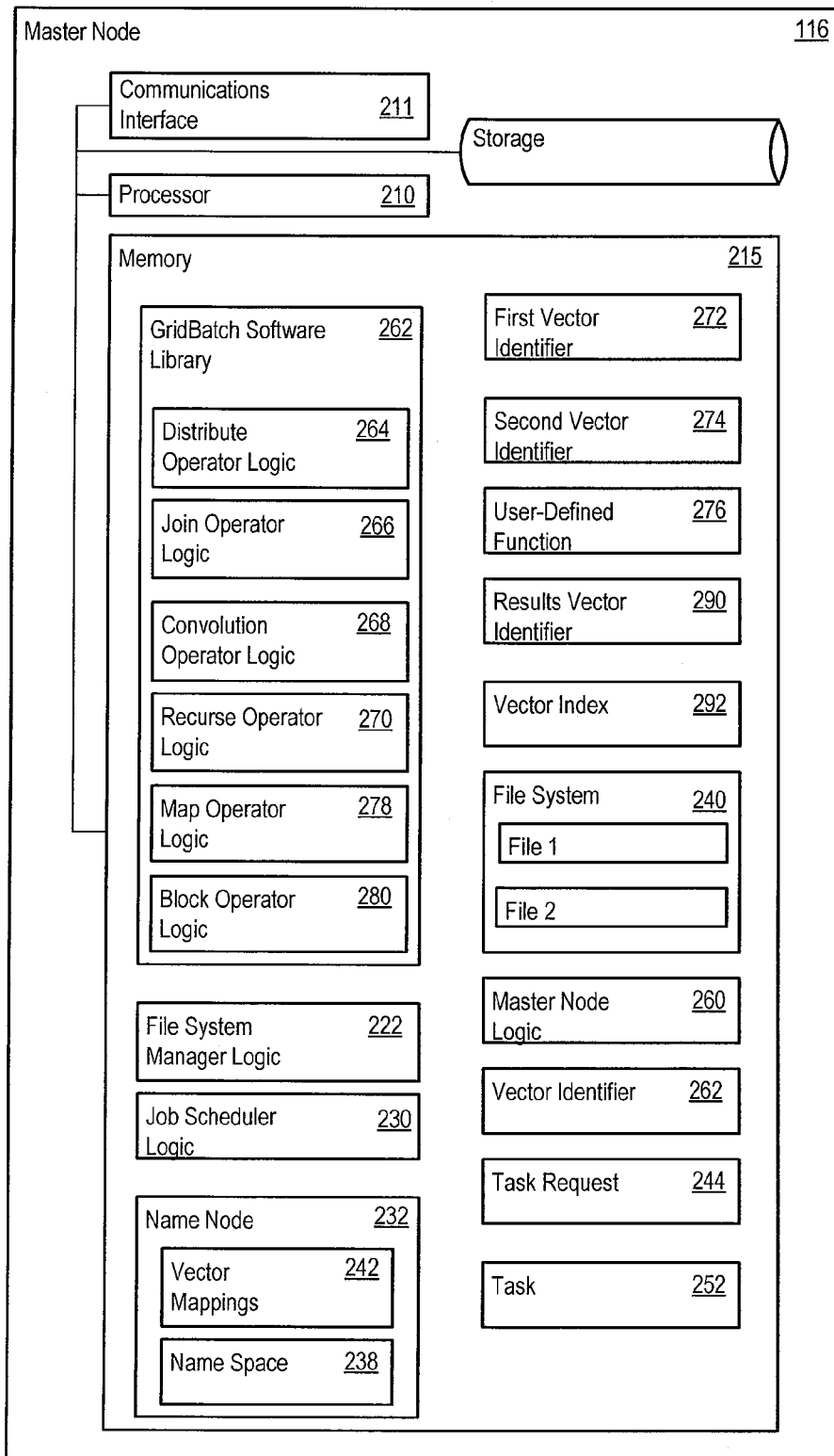
FIG. 2 shows an example Master Node.

FIG. 2 shows an example Master Node 116. The master node 116 may include a communications interface 211 and memory 215. GridBatch 100 uses file system manager logic 222 to manage and store files across all the nodes in GridBatch cluster 102. In one implementation, the file system manager logic 222 segments a large file into smaller chunks and stores the chunks among slave nodes. The file system manager logic 222 maintains a mapping of CID to data node, and moves data automatically to different nodes when the CID to data node mapping changes (e.g., when a data nodes joins and/or leaves the GridBatch cluster 102). GridBatch 100 uses job scheduler logic 230 to coordinate operations between all the nodes in GridBatch cluster 102.

Among all the nodes in GridBatch cluster 102, GridBatch 100 may designate the master node 116 as the name node 232, and designate all other nodes to serve as data nodes (e.g., data node 134). The name node 232 holds the name space 238 of the file system 240. The name node 232 maintains the vector mappings 242 of files to the list of corresponding vector chunks, the data nodes assigned to each chunk, and the physical and logical location of each data node. The name node 232 also responds to task requests 244 for the location of a file. In one implementation, the name node 232 allocates chunks of large files to data nodes.

The master node 116 breaks down a task 252 (e.g., a computation) as expressed in a program by a programmer into slave tasks (e.g., slave task 158) that the job scheduler logic 230 distributes among the slave nodes. In one implementation, the master node 116 distributes the slave tasks across the slave nodes in GridBatch cluster 102, and monitors the slave tasks to make sure all of the tasks complete successfully. Accordingly, when the master node 116 schedules a task 252, the master node 116 can schedule the slave tasks (e.g., slave task 158) on the slave node that also holds the chunk of data to be processed. For example, the master node 116 may decompose the task 252 into slave tasks corresponding to slave nodes where the data to be processed resides locally in vector chunks, so that GridBatch 100 increases computational performance by reducing network bandwidth dependencies by minimizing data transfers and performing data processing on data local to the nodes.

In one implementation, GridBatch 100 implements master node logic 260 on the master node 116 that coordinates communication and interaction between GridBatch cluster 102, the application 104 and user interface 106. The master node logic 260 may coordinate and control the file system manager logic 222 and job schedule logic 230. The master node logic 260 may maintain GridBatch software library 262 that includes the distribute operator logic 264, join operator logic 266, convolution operator logic 268, recurse operator logic 270, map operator logic 278 and block operator 280. The master node 116 may receive task requests 244 and coordinate the execution of the task requests 244 through the slave nodes and the slave node logic 160.

Figure 3:
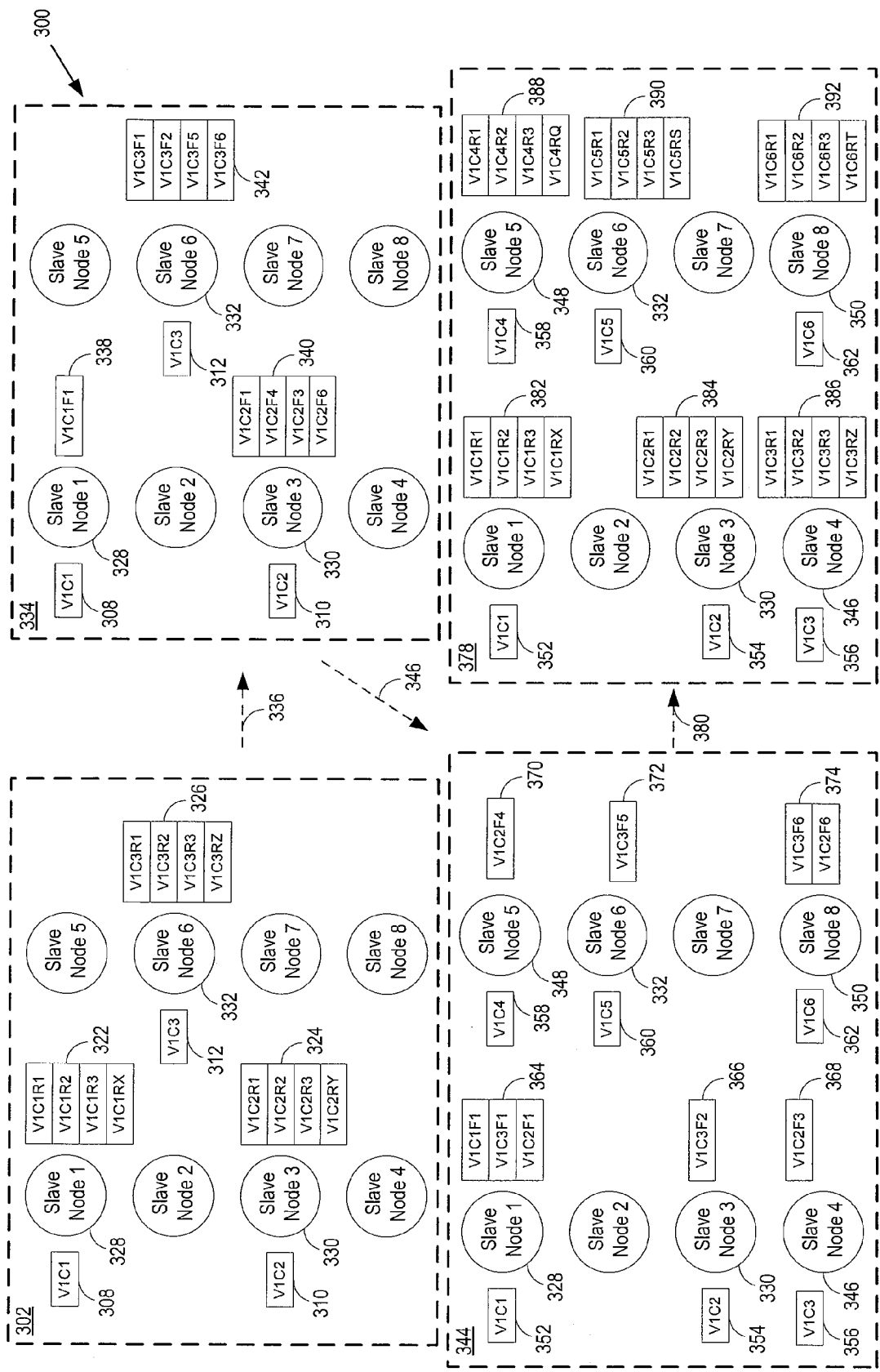
FIG. 3 illustrates the GridBatch system configuration during the processing of a distribute function call.

FIG. 3 shows GridBatch 100 during the processing of a distribute function call 300 (e.g., task request 244) and exercise of the distribute operator logic 264. In one implementation, the master node 116 receives the distribute function call 300 to perform the distribute operator with parameters that include a first vector identifier 272 that identifies a first vector to redistribute to obtain redistributed vector chunks redistributed among a set of nodes. For example, the first vector may represent a previously distributed vector with distributed vector chunks V1C1 308, V1C2 310, and V1C3 312 among a set of nodes (e.g., slave node 1 328, slave node 3 330, and slave node 6 332, respectively). The vector chunks V1C1 308, V1C2 310, and V1C3 312 include corresponding vector chunk records V1C1R1-V1C1RX 322, V1C2R1-V1C2RY 324 and V1C3R1-V1C3RZ 326, respectively.

The master node logic 260 initiates execution of a partition function by spawning partitioning tasks 334 on each set of nodes (e.g., slave node 1 328, slave node 3 330, and slave node 6 332, respectively) with first vector chunks. The arrow 336 represents a transition to a node state where each node with first vector chunks runs partitioning tasks 334. The records of each vector chunk V1C1 308, V1C2 310 and V1C3 312 of the first vector chunk may be evaluated by corresponding partitioning tasks 334 to determine destination vector chunk assignments. For example, each partitioning task 334 may evaluate the first vector chunk records residing on the corresponding slave node to determine a destination vector chunk location to redistribute each first vector chunk record. Each partitioning task 334 may create destination vector chunk assignment files (e.g., V1C1F1 338, V1C2F1-V1C2F4-V1C2F3-V1C2F6 340 and V1C3F1-V1C3F2-V1C3F5-V1C3F5-V1C3F6 342) on the corresponding slave node for each destination vector chunk location (e.g., destination vector chunk assignment) where the first vector chunk records will be redistribute.

The master node 116 may receive task completion notifications from each partitioning task 334 as each partitioning task 334 completes. The master node 116 initiates execution of a redistribution task by spawning redistribution tasks 344 on each slave node (e.g., slave node 1 328, slave node 3 330, slave node 4 346, slave node 5 348, slave node 6 332 and slave node 8 350). The arrow 346 represents a transition to a node state in which each node corresponding to destination vector chunks run redistribution tasks 344. The destination vector chunks (e.g., V1C1 352, V1C2 354, V1C3 356, V1C4 358, V1C5 360 and V1C6 362) indicated by the vector chunk locations identified by the vector chunk assignment files (e.g., V1C1F1 338, V1C2F1-V1C2F4-V1C2F3-V1C2F6 340 and V1C3F1-V1C3F2-V1C3F5-V1C3F6 342). The redistribution tasks 344 initiate the remote copying of the vector chunk assignment files to the corresponding destination slave nodes to collocate the vector chunk assignment files on the slave node corresponding to the vector chunk assigned to the slave node (e.g., V1C1F1-V1C3F1-V1C2F1 364, V1C3F2 368, V1C2F3 370, V1C2F4 372, V1C3F5 374, and V1C3F6-V1C3F6 376).

The redistribution tasks 344 initiates a merge 378 of the records (e.g., V1C1R1-V1C1RX 382, V1C2R1-V1C2RY 384, V1C3R1-V1C3RZ 386, V1C4R1-V1C4RQ 388, 388, V1C5R1-V1C5RS 390 and V1C6R1-V1C6RT 392) located in each vector chunk assignment file corresponding to a particular destination vector chunk. The arrow 380 represents a transition to a node state in which each node corresponding to destination vector chunks perform the merge 378. The merge 378 results in the redistributed vector chunks of the first vector redistributed among the set of nodes. The slave node logic 160 of each slave node sends the master node 116 a completion notice that indicates the completion status of the merge 378.

Figure 4:
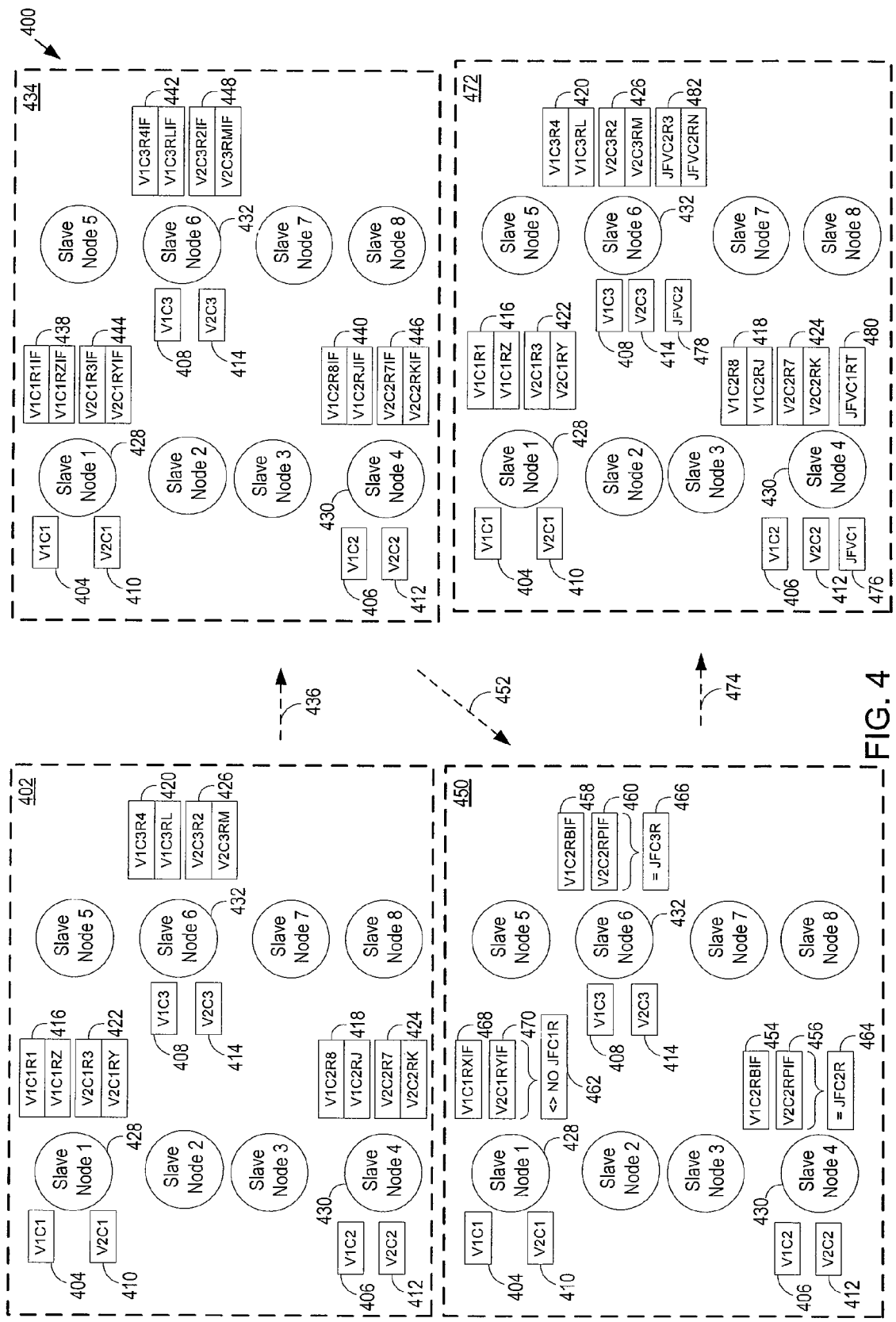
FIG. 4 shows the GridBatch system configuration during the processing of a join function call.

FIG. 4 shows GridBatch 100 during the processing of a join function call 400 (e.g., task request 244) and exercise of the join operator logic 266. In one implementation, the master node 116 receives the join function call 400 with parameters that include the first vector identifier 272 and a second vector identifier 274, and a user-defined join function (e.g., a user-defined function 276). The first vector identifier 272 and a second vector identifier 274 identify the first vector and a second vector partitioned into first vector chunks (e.g., V1C1 404, V1C2 406 and V1C3 408) and second vector chunks (e.g., V2C1 410, V2C2 412 and V2C3 414). The first vector chunks and second vector chunks include first vector chunk records (e.g., V1C1R1-V1C1RZ 416, V1C2R8-V1C2RJ 418 and V1C3R4-V1C3RL 420) and second vector chunk records (e.g., V2C1R3-V2C1RY 422, V2C2R7-V2C2RK 424 and V2C3R4-V2C3RM 426 ), respectively.

The master node 116 initiates spawning of sorting tasks (e.g., slave tasks 158) locally on the set of nodes (e.g., slave node 1 428, slave node 4 430 and slave node 6 432 ) corresponding to the location of the first vector chunks and second vector chunks to sort each of the first vector chunks and second vector chunks for the second vector located on each of the set of nodes. In one implementation, the sorting task 434 sorts the first vector records and the second vector records according to an index value of the join index field present in each first vector record of the first vector (e.g., V1C1R1IF-V1C1RZIF 438, V1C2R8IF-V1C2RJIF 440 and V1C3R4IF-V1C3RLIF 442) and each second vector record of the second vector (e.g., V2C1R3IF-V2C1RYIF 444, V2C2R7-V2C2RKIF 446 and V2C3RMIF 448), respectively. The arrow 436 represents a transition to a node state in which each node with vector chunks runs sorting tasks 434.

In one implementation, the sorting task 434 compares the index value of the index field present in the first vector records and the second vector records to determine first vector records and second vector records that include matching index values and apply the user-defined function 276 (e.g., a user-defined join function) to first vector records and second vector records with matching index field values. The sorting task 434 performs a matching task 450 which compares the index field values of the index fields of the first vector records and second vector records. The arrow 452 represents a transition to a node state in which each node with vector chunks run matching tasks 450. The matching task 450 applies the user-defined function 276 (e.g., a user-defined join function) to first vector records and second vector records with matching index field values for corresponding vector chunks (e.g., V1C2RBIF 454 and V2C2RPIF 456, and V1C2RBIF 458 and V2C2RPIF 460) to obtain a join function chunk result (e.g., "NO JFC1R" 462, JFC2R 464 and JFC3R 466). The matching task 450 does not apply the user-defined join function to first vector records and second vector records when the index field values for corresponding vector chunks do not match (e.g., V1C1RXIF 468 and V2C1RYIF 470).

The join function chunk results form a join function vector result that identify join function vector chunks (e.g., JFVC1 476 and JFVC2 478) that include join function vector chunk records (JFVC1RT 480 and JFVC2R3-JFVC2RN 482) obtained from the join function chunk results (e.g., JFC2R 464 and JFC3R 466). In one implementation, the slave node logic 160 of each slave node sends the master node 116 a completion notice that indicates that the completion status of the sorting task 434.

For example, in one implementation, a programmer may use GridBatch 100 to index two vectors, a product vector (e.g., first vector identified by the first vector identifier 272) indexed by a product id field (e.g., index fields V1C1R1IF-V1C1RZIF 438, V1C2R8IF-V1C2RJIF 440 and V1C3R4IF-V1C3RLIF 442) and the customer vector (e.g., second vector identified by the second vector identifier 274) indexed by customer id field (e.g., index fields V2C1R3IF-V2C1RYIF 444, V2C2R7-V2C2RKIF 446 and V2C3R4-V2C3RMIF 448). The product vector includes the product id and the customer id corresponding to the products purchased (e.g., index field values). The customer vector holds the customer id and the demographic information of the customers (e.g., index field values such as age, address, gender). In the event the programmer desires to know how many people in each age group purchased a particular product, the programmer invokes a join function call with the product vector and the customer vector as parameters to obtain a join result that links the product ID information with the customer demographic information. In one implementation, in order to ensure the highest performance by GridBatch 100 in processing the join function call 400 of the product vector and the customer vector based on the customer id field (e.g., index field), the programmer invokes the distribute function call 300 to index the product vector by the customer id instead of the product id. The distribute function call ensures that GridBatch 100 distributes the records of the product vector to the nodes in GridBatch cluster 102 according to the customer id field. GridBatch 100 then may apply the user-defined function 276 (e.g., a user-defined join function) to each record of the product vector and the customer vector where the customer id field values of both product vector and the customer vector equal to obtain the join function vector result.

Figure 5:
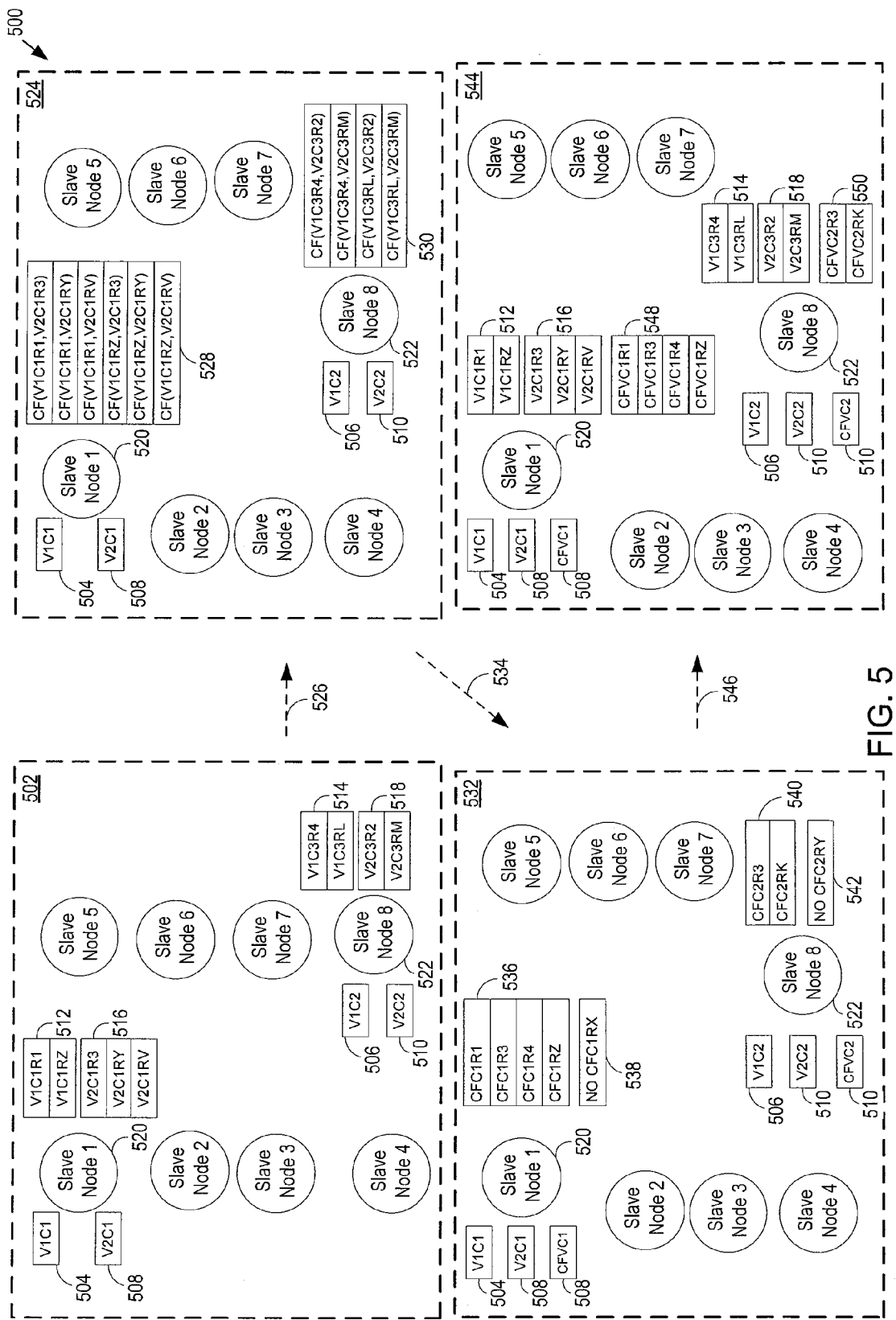
FIG. 5 shows the GridBatch system configuration during the processing of a convolution function call.

FIG. 5 shows GridBatch 100 during the processing of a convolution function call 500 (e.g., task request 244) and exercise of the convolution operator logic 268. In one implementation, the master node 116 receives the convolution function call 500 with parameters that include the first vector identifier 272 and the second vector identifier 274, and a user-defined convolution function (e.g., a user-defined function 276). The first vector identifier 272 and a second vector identifier 274 identify the first vector and a second vector partitioned into first vector chunks (e.g., V1C1 504 and V1C2 506) and second vector chunks (e.g., V2C1 508 and V2C2 510) correspond to partitioned vector chunks distributed across the nodes of GridBatch cluster 102. The first vector chunks and second vector chunks include first vector chunk records (e.g., V1C1R1-V1C1RZ 512 and V1C3R4-V1C3RL 514) and second vector chunk records (e.g., V2C1R3-V2C1RY 516 and V2C3R4-V2C3RM 518), respectively.

The master node 116 initiates spawning of convolution tasks (e.g., slave tasks 158) locally on the set of nodes (e.g., slave node 1 520 and slave node 8 522) corresponding to the location of the first vector chunks and second vector chunks. The arrow 526 represents a transition to a node state for each node where the master node 116 spawns the convolution tasks 524. The convolution tasks 524 apply the user-defined function 276 (e.g., a user-defined convolution function) locally to the permutations of first vector chunk records and second vector chunk records (e.g., 528 and 530). The user-defined convolution function evaluates each permutation of corresponding first vector chunk records and second vector chunk records (e.g., 528 and 530) to obtain convolution function evaluation results (e.g., 536, 538, 540 and 542). The arrow 534 represents a transition to a node state for each node where the user-defined convolution function evaluates each permutation of corresponding first vector chunk records and second vector chunk records. The convolution function evaluation results may indicate when a permutation of the corresponding first vector chunk records and second vector chunk records results in a convolution function chunk result records (e.g., CFC1R1-CFC1R3-CFC1R4-CFC1RZ 536 and CFC2R3-CFC2RK 540). The convolution function evaluation results may indicate when a permutation of the corresponding first vector chunk records and second vector chunk records results in no convolution function chunk result records (e.g., "NO CFC1RX" 538 and "NO CFC2RY" 542). The user-defined convolution function may transform the convolution function results into convolution function chunk result records (e.g., CFVC1R1-CFVC1R3-CFVC1R4-CFVC1RZ 548 and CFVC2R3-CFVC2RK 550) to obtain convolution function results for each node (e.g., slave node 1 520 and slave node 8 522).

For example, in one implementation, a programmer may invoke the convolution function call 500 to determine the number of customers located in close proximity to the distributors of a retailer. The file system manager logic 222 may include a customer vector (e.g., first vector identified by the first vector identifier 272) that includes a physical location field that indicates the physical location of each customer and a distributor vector (e.g., second vector identified by the second vector identifier 274) that includes a physical location field that indicates the physical location of each distributor. The programmer may invoke the convolution function call 500 to apply a user-defined convolution function (e.g., user-defined function 276) to the customer vector and distributor vector based on the physical location field to evaluate the physical distance between each customer and each distributor and obtain a convolution function results vector. In one implementation, the user-defined convolution function may be expressed as convFunc. Before the convolution call, the customer vector may be partitioned into customer vector chunks (e.g., first vector chunks—V1C1 504 and V1C2 506) partitioned across the nodes of GridBatch cluster 102 according to the physical location field (e.g., index field) present in each of the customer vector records. The distributor vector chunks (e.g., second vector chunks—V2C1 508 and V2C2 510) may be copied to all nodes of the cluster. This can be achieved by supplying a partition function which always returns a list of all nodes to the distribute operator. The user-defined convolution function evaluates the permutations of customer vector records and the distributor vector records residing on corresponding slave nodes, to obtain convolution function chunk results records. In other words, where the customer vector chunk has Z number of records and the distributor vector chunk has K number of records, the user-defined convolution function may evaluate Z×K number of permutations where for each record 1 through Z of the customer vector chunk GridBatch 100 applies the user-defined convolution function to every record 1 though K of the distributor vector chunk. The result of the convolution function call performed by each slave node of GridBatch cluster 102 results in corresponding convolution function vector chunks to obtain convolution function results for each node (e.g., slave node 1 520 and slave node 8 522).

Figure 6:
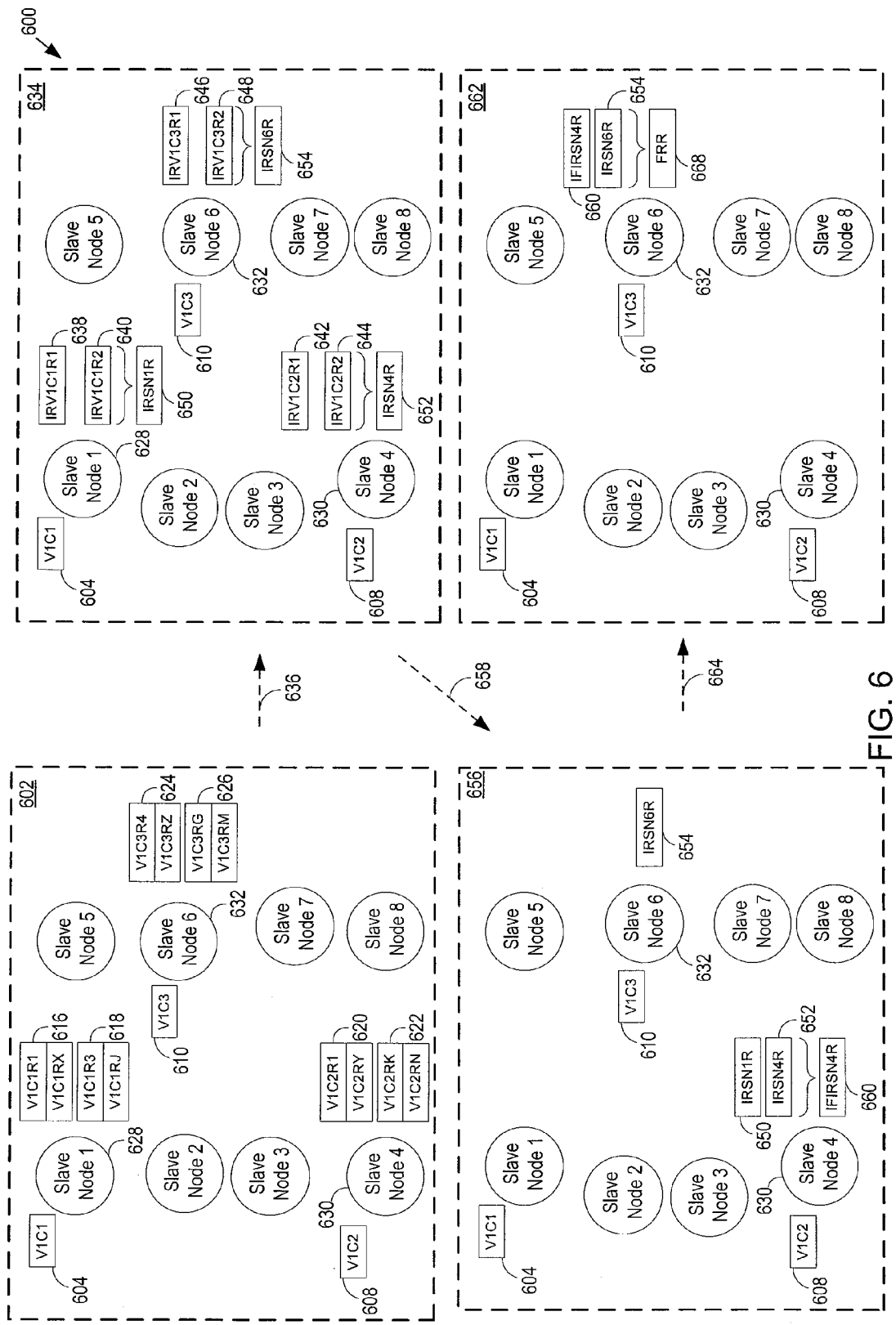
FIG. 6 illustrates the GridBatch system configuration during the processing of a recurse function call.

FIG. 6 illustrates GridBatch 100 during the processing of a recurse function call 600 (e.g., task request 244) and exercise of the recurse operator logic 270. In one implementation, the master node 116 receives the recurse function call 600 with parameters that include the first vector identifier 272 and a user-defined recurse function (e.g., a user-defined function 276). The first vector identifier 272 identifies the first vector partitioned into first vector chunks (e.g., V1C1 604, V1C2 606 and V1C3 610) corresponding to partitioned vector chunks distributed across the nodes of GridBatch cluster 102. The first vector chunks include first vector chunk records (e.g., V1C1R1-V1C1RX 616, V1C1R3-V1C1RJ 618, V1C2R1-V1C2RY 620, V1C2RK-V1C2RN 622, V1C3R4-V1C3RZ 624 and V1C3RG-V1C3RM 626).

The master node 116 initiates spawning of recurse tasks 634 (e.g., slave tasks 158) locally on the set of nodes (e.g., slave node 1 628, slave node 4 630 and slave node 6 632) corresponding to the location of the first vector chunks. The arrow 636 represents a transition to a node state in which each node with first vector chunks run the recurse tasks 634. The recurse tasks 634 initially apply the user-defined recurse function to the first vector chunk records to produce intermediate recurse vector chunk results for each first vector chunks (e.g., IRV1C1R1 638, IRV1C1R2 640, IRV1C2R1 642, IRV1C2R2 644, IRV1C3R1 646 and IRV1C3R2 648). The recurse tasks invoke the user-defined recurse function on the intermediate recurse vector chunk results to produce intermediate recurse slave node results (e.g., IRSN1R 650, IRSN4R 652 and IRSN6R 654).

The recurse tasks communicate a subset of the intermediate recurse slave node results (e.g., IRSN1R 650) to a subset of the set of nodes (e.g., slave node 4 630) and the recurse tasks iterate invocation of the user-defined recurse function on the intermediate results (e.g., IRSN1R 650 and IRSN4R 652) to produce increasingly fewer intermediate slave node results (e.g., IFIRSN4R 660). The recurse tasks communicate a subset of the increasingly fewer intermediate results (e.g., IFIRSN4R 660) to an increasingly smaller subset of the set of nodes (e.g., slave node 6 632) until GridBatch 100 obtains a final recurse result (e.g., FRR 668) on a final node in the set of nodes.

In one implementation, a subset of the intermediate results communicated by the recurse tasks to a subset of the set of nodes includes one-half of the intermediate results that produce a subset of increasingly fewer intermediate results. Similarly, each subset of increasingly fewer intermediate results subsequently communicated by the recurse tasks to a subset of the set of nodes includes one-half of the increasingly fewer intermediate results. In one implementation, the recurse operator logic 270 uses network topology information to improve computation performance of the recurse operator by identifying nearby neighbour slave nodes where intermediate results can be sent and/or retrieved in order to reduce network bandwidth consumption. The programmer, user and/or GridBatch 100 may define the factors that determine whether a slave node constitutes a nearby neighbour slave node to another slave node. The factors that may be used to determine whether a slave node is designated a nearby neighbour slave node may include data transmission times between slave nodes, the number of network hops (e.g., number of network routers) between slave nodes, or a combination of data transmission times and network hops.

FIG. 6 illustrates how the GridBatch recurse operator logic 270 distributes intermediate results among slave nodes of GridBatch cluster 102. The slave nodes may compute a local intermediate recurse result (e.g., IRSN1R 650, IRSN4R 652 and IRSN6R 654). A subset of the slave nodes (e.g., slave node 1 628) may transmit the local intermediate recurse result (e.g., IRSN1R 650) to a subset of the slave nodes (e.g., slave node 4 630). The slave nodes receiving intermediate recurse results from other slave nodes may iteratively apply the transmitted intermediate results (e.g., IRSN1R 650) with the local intermediate results (e.g., IRSN4R 652). Iteratively, until a single slave node (e.g., slave node 6 632) produces the final recurse result (e.g., FRR 668), a subset (e.g., one-half) of the slave nodes transmit intermediate results to the other one-half of nodes with local intermediate results (e.g., folding transmitted intermediate results into local intermediate results). In one implementation, the master node determines the scheme for passing intermediate results to slave nodes in the set of nodes and the number of folding iterations required to produce a final recurse result (e.g., FRR 668).

Figure 7:
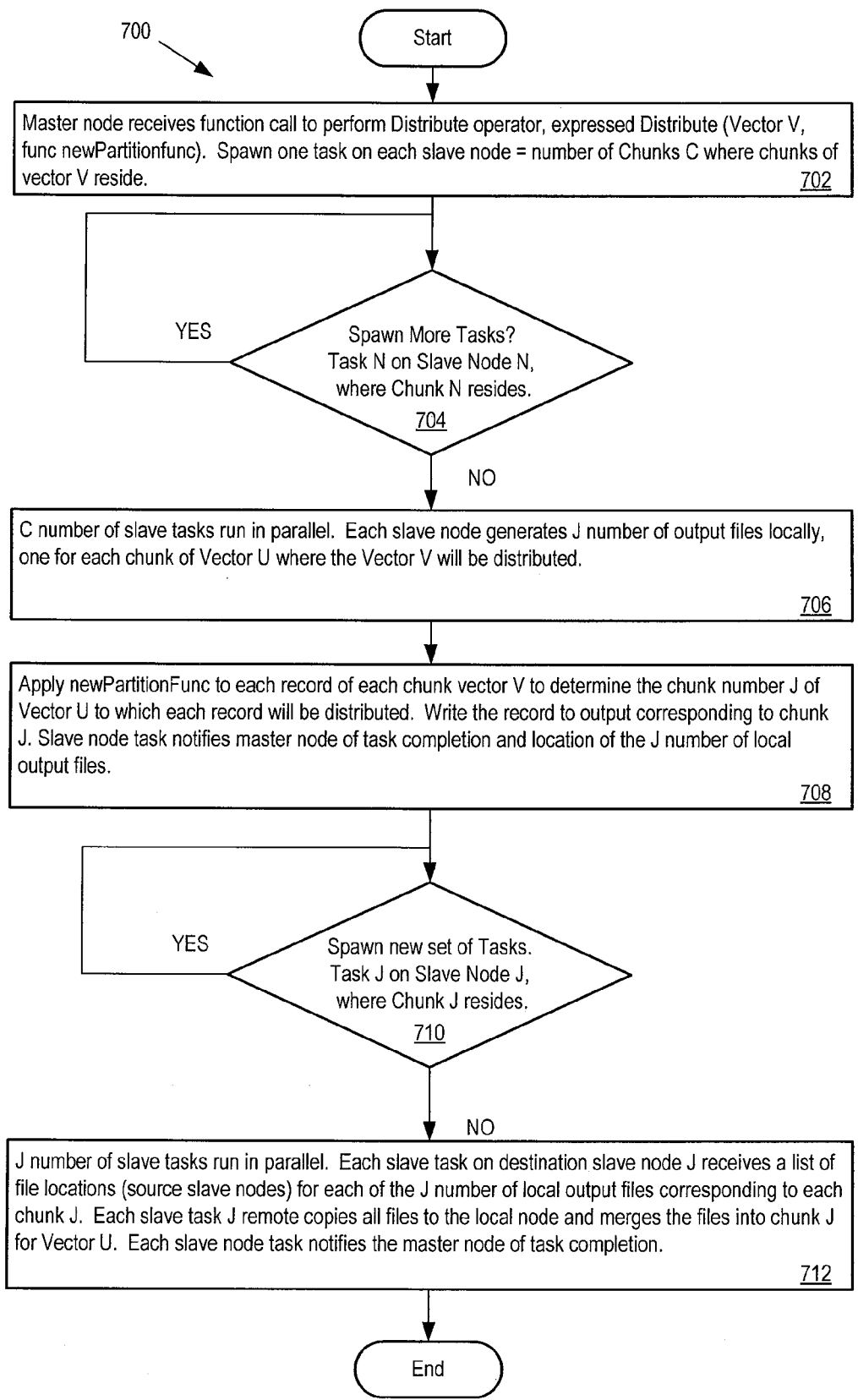
FIG. 7 illustrates the logic flow the GridBatch system configuration may take to perform the distribute operator.

FIG. 7 illustrates the logic flow GridBatch 100 may take to perform the distribute operator. In one implementation, the master node 116 receives the distribute function call 300 to perform the distribute operator. In one implementation, the distribute function call 300 may be expressed as Distribute (vector V, func newPartitionfunc). Vector V represents the source vector and the newPartitionfunc represents a function that determines the location of new nodes for data in vector V. FIG. 7 and the discussion here uses vector U as a notational aid to explain the redistribution of the data in vector V. Vector V contains the same data as vector U. The distribute function call 300 results in one vector remaining, possibly partitioned into new chunks that may be redistributed to a different set of nodes. The master node logic 260 spawns a slave task (e.g., slave task 158) corresponding to each vector chunk of vector V (702). In one implementation, the number of slave tasks equal the number of vector chunks of vector V. The slave tasks reside on the slave nodes where corresponding vector chunks reside (704). Localizing the slave tasks to slave nodes where corresponding vector chunks reside minimizes data transfer and avoids network bandwidth scaling issues. Slave nodes invoke slave node logic 212 to generate output files corresponding to vector chunks of vector U where GridBatch 100 will redistribute records of vector V (706). The slave node logic 160 evaluates each record of the corresponding vector chunk of V to determine the chunk identifier of vector U where GridBatch 100 will redistribute the record. The slave node logic 160 writes the record to the output file corresponding to the vector chunk of vector U where GridBatch 100 will redistribute the record of vector V.

As each slave task completes evaluation of the records of the corresponding vector chunks of V, each slave task notifies the master node logic 260 of the completion status of the slave task and the location of the output files corresponding to the vector chunks of vector U (708). The master node logic 260 spawns new slave tasks on slave nodes where GridBatch 100 will redistribute vector chunks of vector V to vector chunks of vector U (710). Each slave task receives a list of the locations of output files that include vector chunks of U that correspond to the slave node corresponding to the slave task and retrieves the output files to the slave node (e.g., using a remote copy operation, or other file transfer). Each slave task merges the output files into corresponding vector chunks of U and notifies the master node logic 260 of the completion status of the slave task (712). In one implementation, the distribute function call 300 distributes all records of the first vector to all the available slave nodes. For example, the newPartitionfunc of the distribute function call 300 expressed as Distribute (vector V, func newPartitionfunc) may direct GridBatch 100 to distribute each record of vector V to all of the available slave nodes to duplicate vector V on all the available slave nodes.

Figure 8:
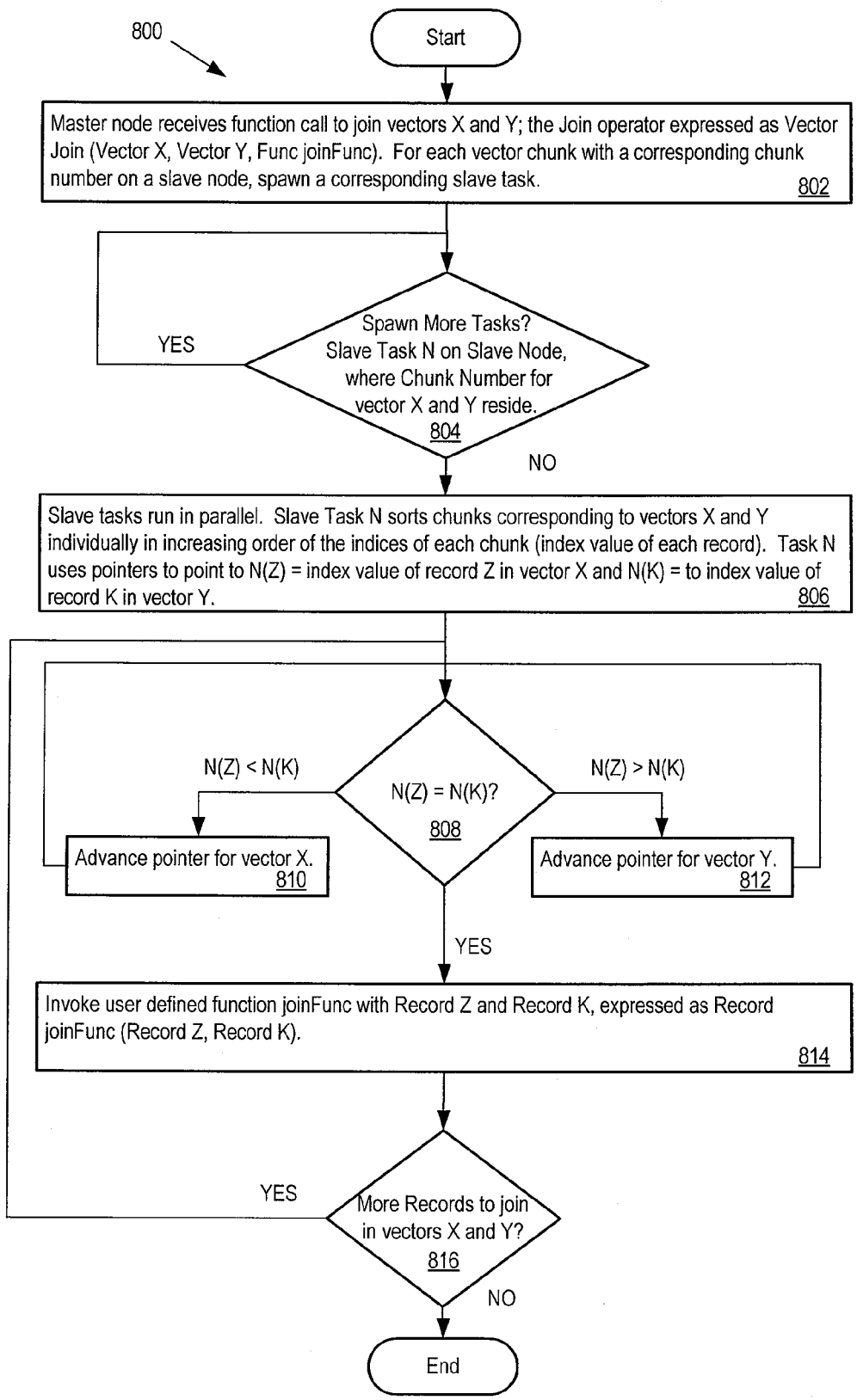
FIG. 8 shows the logic flow the GridBatch system configuration may take to perform the join operator.

FIG. 8 shows the logic flow GridBatch 100 may take to perform the join operator. In one implementation, the master node logic 260 receives the join function call 400 to join vector X and vector Y. In one implementation, the join function call 400 may be expressed as Vector Join (vector X, vector Y, Func joinFunc) (802). The master node logic 260 spawns a slave task corresponding to a vector chunk number (e.g., vector chunk id), where the file system manager logic 222 partitions vector X and vector Y into an equal number of vector chunks and the file system manager logic 222 assigns vector chunks of X and vector chunks of Y with corresponding chunk numbers or vector chunk ids (804). For example, the file system manager logic 222 may assign a particular chunk id to both a vector chunk of X and a vector chunk of Y residing on a corresponding slave node. In one implementation, the slave task sorts, according to an indexed field value, the records of the vector chunk of X and records of vector chunk of Y residing on the corresponding slave node (806). The slave task invokes slave node logic 160 and evaluates the indexed field value of the records of the vector chunk of X and records of vector chunk of Y. Where the indexed field values of the records of the vector chunk of X and records of vector chunk of Y equal (808), GridBatch 100 invokes a user-defined join function (e.g., user-defined function 276). In one implementation, the user-defined join function may be expressed as Record joinFunc (Record Z, Record K) that joins the records of the vector chunk of X and records of vector chunk of Y (814). Where the slave node logic 160 evaluates the indexed field value of record Z of vector chunk X to be less than the indexed field value of record K of vector chunk of Y then the slave node logic 160 evaluates the next record Z of vector chunk of X with the indexed field value of record K of vector chunk of Y (810). Where the slave node logic 160 evaluates the indexed field value of record Z of vector chunk X to be greater than the indexed field value of record K of vector chunk of Y then the slave node logic 160 evaluates the next record K of vector chunk of Y with the indexed field value of record Z of vector chunk of X (812). The slave node logic 160 evaluates every record Z of vector chunk of X and record K of vector chunk of Y (816).

Figure 9:
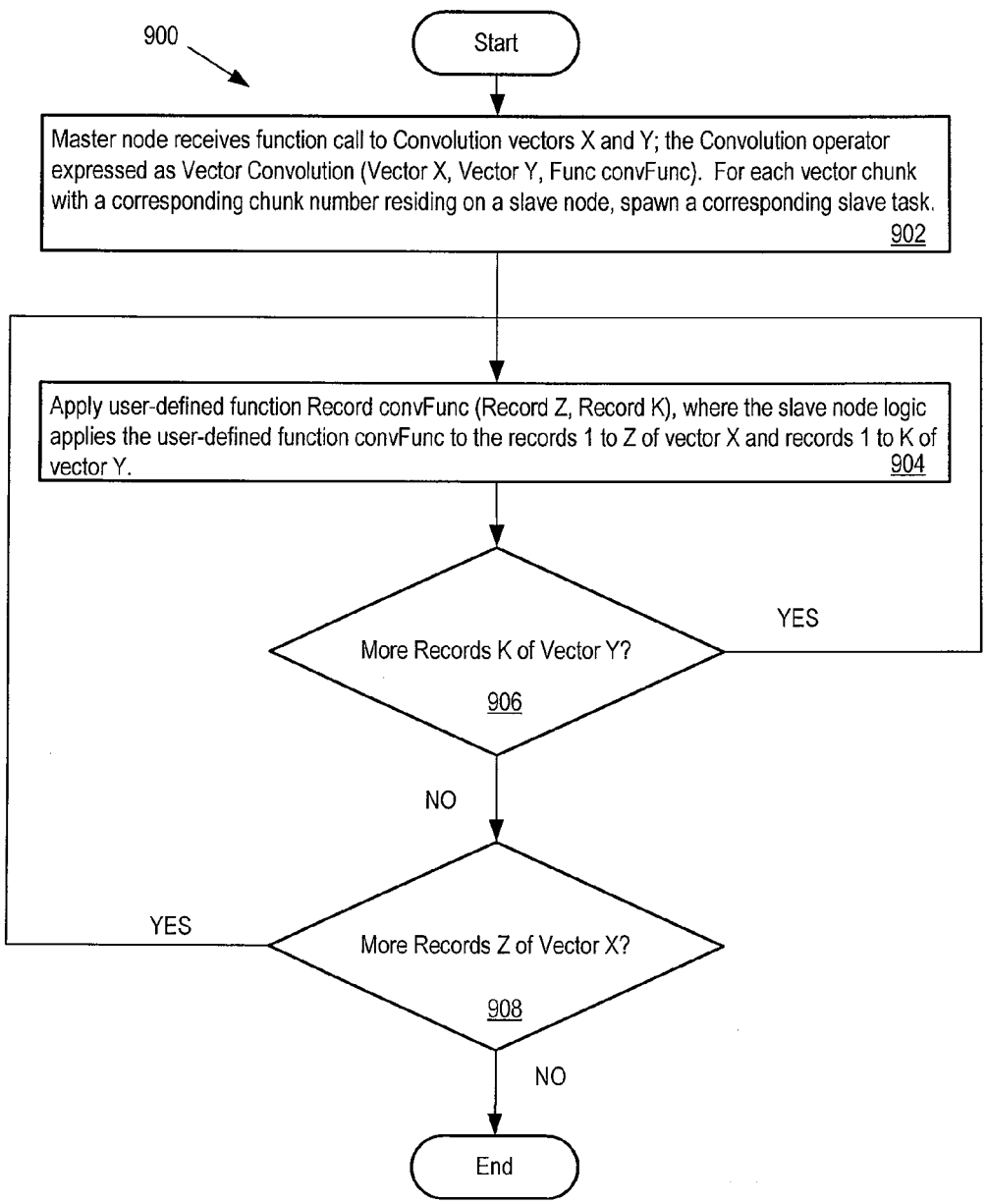
FIG. 9 shows the logic flow the GridBatch system configuration may take to perform the Convolution operator.

FIG. 9 shows the logic flow GridBatch 100 may take to perform the convolution operator. In one implementation, the master node logic 260 receives the convolution function call 500 to process vector X and vector Y (902). In one implementation, the convolution function call 500 may be expressed as Vector Convolution (vector X, vector Y, Func convFunc), where convFunc is the user-defined specified convolution function. For each record 1 to Z of the vector chunks of vector X the master node logic 260 applies a user-defined convolution function (e.g., user-defined function 276), expressed as Record convFunc (Record Z, Record K) to records 1 to K of vector chunks of vector Y (904). In other words, where a vector chunk of vector X has Z number of records and a vector chunk of vector Y has K number of records, the user-defined convolution function evaluates Z×K number of permutations of record pairs. The slave node logic 160 applies the user-defined convolution function to each record 1 though K of the vector Y (906) with every record 1 through Z of the vector chunk X (908).

Figure 10:
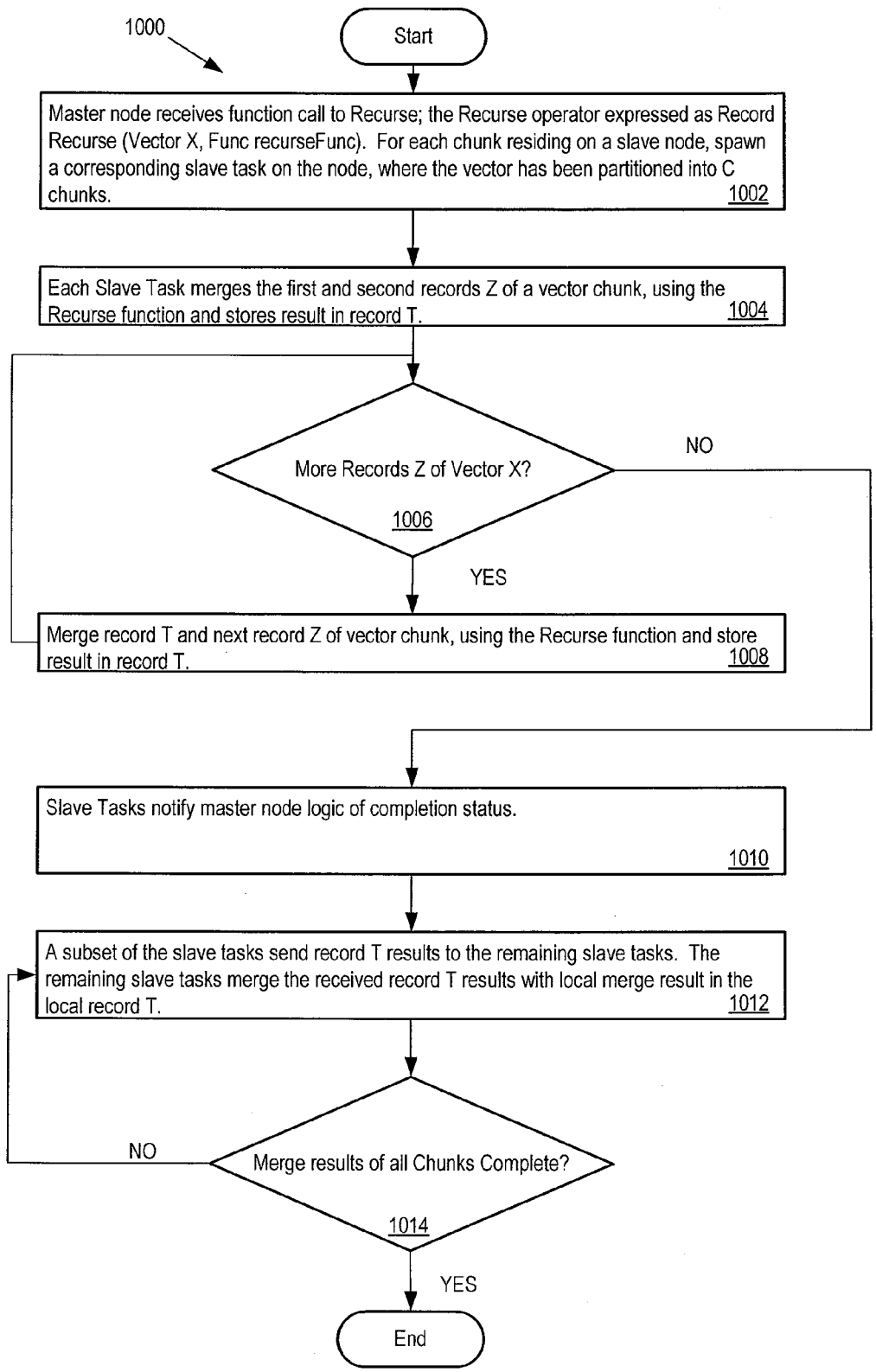
FIG. 10 shows the logic flow the GridBatch system configuration may take to perform the recurse operator.

FIG. 10 shows the logic flow GridBatch 100 may take to perform the recurse operator. In one implementation, the master node logic 260 receives the recurse function call 600 to recurse vector X. In one implementation, the recurse function call 600 may be expressed as Record Recurse (vector X, Func recurseFunc). The master node logic 260 spawns recurse operation slave tasks corresponding to each vector chunk residing on corresponding slave nodes (1002). Slave tasks invoke slave node logic 160 to reduce (e.g., merge) the first record and the second records of vector chunk of vector X residing on corresponding slave nodes. The slave node logic 160 stores the intermediate recurse (e.g., merger) result (1004). The slave node logic 160 evaluates whether more records of vector chunk of vector X exist (1006) and merges the next record of vector chunk of vector X to the intermediate merge result (1008). Once the slave node logic 160 obtains the intermediate merge result of the vector chunks of vector X, each slave task notifies the master node logic 260 of the completion status of the slave task (1010). A subset of slave tasks (e.g., one-half) send intermediate merge results to the remaining slave tasks (e.g., the other one-half) with local intermediate results. The subset of slave tasks receiving the intermediate merge results merge the intermediate merge tasks with local intermediate merge results (1012). The slave nodes with intermediate merge results iteratively fold the intermediate merge results into fewer slave nodes, until the slave nodes merge the increasingly smaller number of intermediate merge results into a final merge result residing on one slave node (1014).

Figure 11:
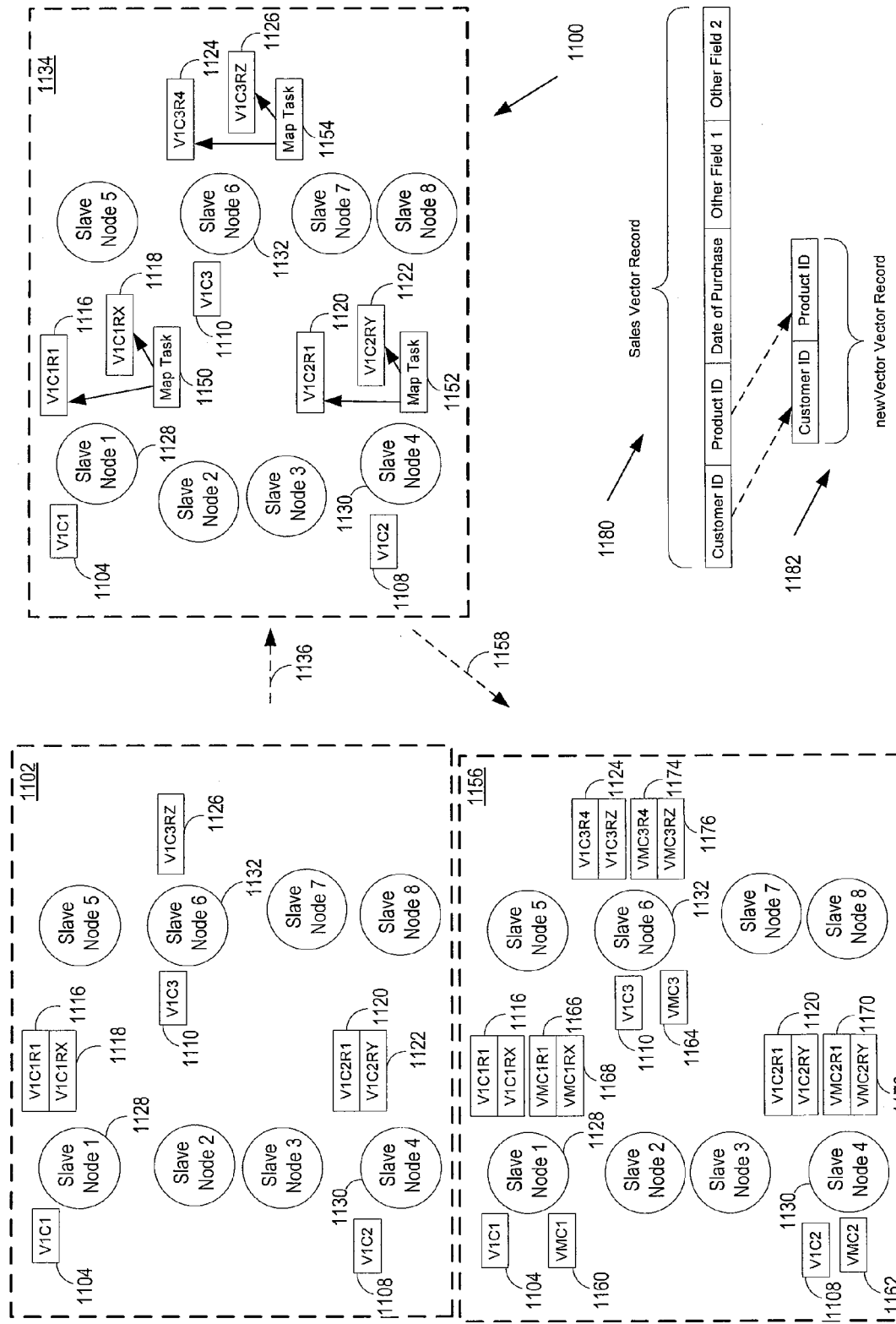
FIG. 11 illustrates GridBatch system configuration during the processing of a map function call.

FIG. 11 illustrates GridBatch 100 during the processing of a map function call 1100 (e.g., task request 244) and exercise of the map operator logic 278. The map operator may be expressed as Vector Map(vector V, Func mapFunc) where V represents the vector, more specifically the records of the vector, to which the mapFunc will be applied to obtain a new vector of mapped records of vector V. The map operator allows the user to apply a user-defined function to all the records of a vector. In one implementation, the master node logic 260 receives the map function call 1100 with parameters that include a first vector identifier 272 and a user-defined map function (e.g., a user-defined function 276). The first vector identifier 272 identifies the first vector partitioned into first vector chunks (e.g., V1C1 1104, V1C2 1108 and V1C3

1110) corresponding to partitioned vector chunks distributed across the nodes of GridBatch cluster 102. The first vector chunks include first vector chunk records (e.g., V1C1R1 1116, V1C1RX 1118, V1C2R1 1120, V1C2RY 1122, V1C3R4 1124, and V1C3RZ 1126).

The master node 116 initiates spawning of map tasks (e.g., slave tasks 158) locally on the set of nodes (e.g., slave node 1 1128, slave node 4 1130 and slave node 6 1132) corresponding to the location of the first vector chunks. The arrow 1136 represents a transition to a node state in which each node with first vector chunks run the map tasks 1134 (e.g., map tasks running in parallel 1150, 1152 and 1154). The map tasks 1134 apply the user-defined map function to each of first vector chunk records to produce the mapped vector chunk records that form mapped vector chunks of vector M. The arrow 1158 represents a transition to a node state in which each node with first vector chunks includes corresponding mapped vector chunks (e.g., VMC1 1160, VMC2 1162, and VMC3 1164) with corresponding mapped vector chunk records (e.g., VMC1R1 1166, VMC1RX 1168, VMC2R1 1170, VMC2RY 1172, VMC3R4 1174, and VMC3RZ 1176).

For example, a sales record vector 1180 may include a customer ID, product ID, and date of purchase field, along with several other fields. However, for a particular analysis, only two fields of the sales record vector may be of interest, such as the customer ID and the product ID. For efficient processing performance, a programmer may invoke the map function call 1100 to perform the map operator to extract just the customer ID and the product ID fields from the sales record vector; the map function call 1100 may be expressed in the following form: Vector newVector=Map(saleRecordVector, chop). The user-defined chop function parses each record of the sale record vector 1180 to produce new records that only include the customer ID and product ID fields in the newVector 1182 records.

Figure 12:
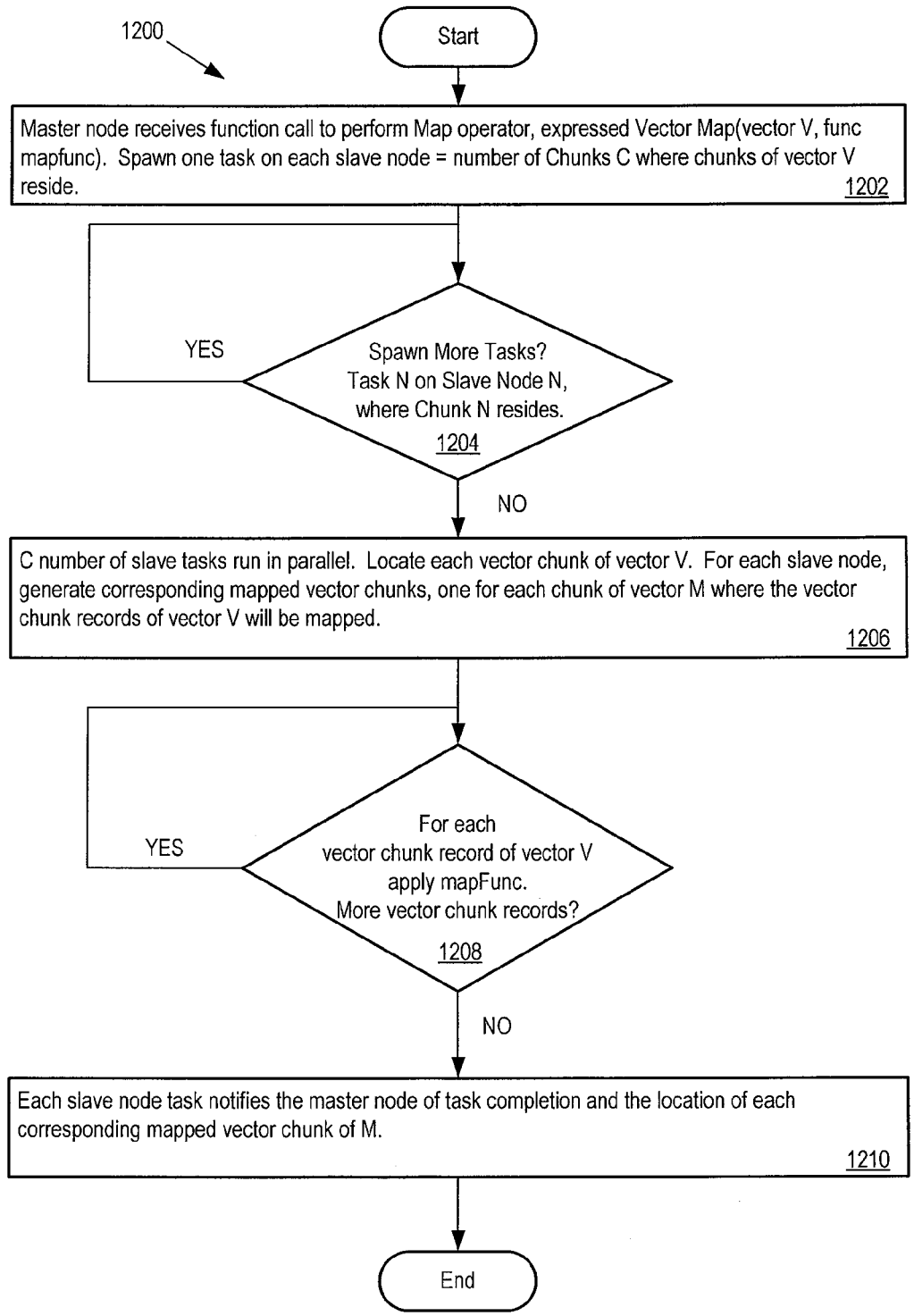
FIG. 12 shows the logic flow GridBatch 100 may take to perform the map operator.

FIG. 12 shows the logic flow GridBatch 100 may take to perform the map operator. The master node logic 260 receives the map function call 1100 to map vector V (1202). The master node logic 260 spawns slave tasks corresponding to each vector chunk of vector V (1204). Slave tasks invoke slave node logic 160 to locate each vector chunk of vector V assigned to corresponding slave nodes (1206). For each vector chunk of vector V, the slave node logic 160 applies the user-defined mapFunc to each vector chunk record to obtain mapped vector chunk records that form a mapped vector chunk of vector M (1208). Once the slave node logic 160 has applied the mapFunc to each vector chunk record of vector V, each slave task notifies the master node logic 260 of the completion status of the slave task and the location of the corresponding mapped vector chunk of M. The map operator successfully finishes when the slave nodes notify the master node that all slave tasks have finished (1210). The mapped vector chunks of vector M combine to form a new vector M.

Figure 13:
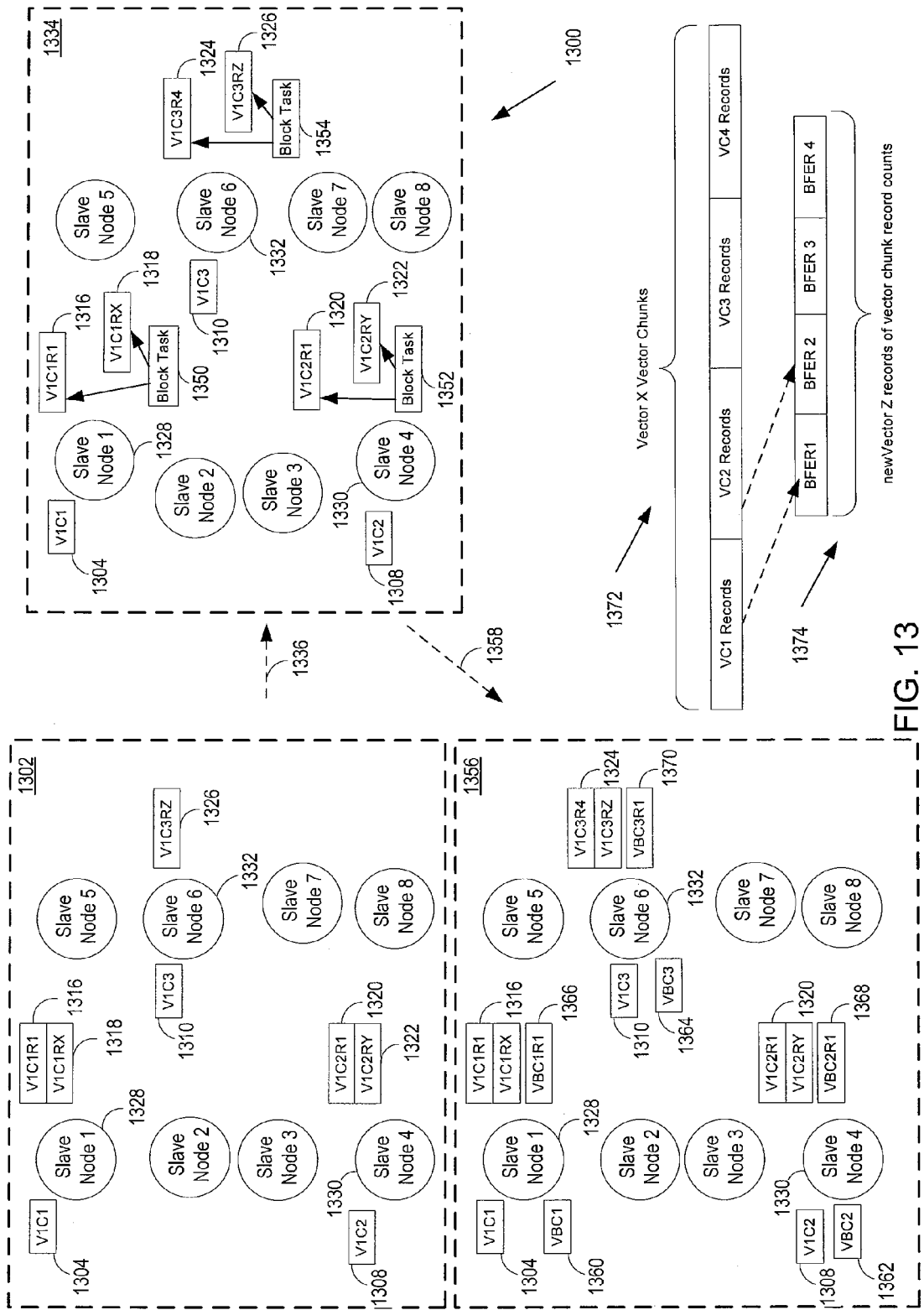
FIG. 13 illustrates the GridBatch system configuration during the processing of a block function call.

FIG. 13 illustrates GridBatch 100 during the processing of a block function call 1300 (e.g., task request 244) and exercise of the block operator logic 280. The block operator may be expressed as Vector BLO(Vector X, Func bloFunc) where X represents an input vector, more specifically the records of the vector X, to which the bloFunc will be applied to obtain block function evaluation results that represent values for block function evaluation records that form new vector Z. The block operator allows the user to apply a user-defined function to all the records of a vector chunk. In one implementation, the master node logic 260 receives the block function call 1300 with parameters that include a first vector identifier 272 and a user-defined bloFunc function (e.g., a user-defined function 276). The first vector identifier 272 identifies the first vector partitioned into first vector chunks (e.g., V1C1 1304, V1C2 1308 and V1C3 1310) distributed across the nodes of GridBatch cluster 102. The first vector chunks include first vector chunk records (e.g., V1C1R1 1316, V1C1RX 1318, V1C2R1 1320, V1C2RY 1322, V1C3R4 1324, and V1C3RZ 1326).

The master node 136 initiates spawning of block tasks (e.g., slave tasks 158) locally on the set of nodes (e.g., slave node 1 1328, slave node 4 1330 and slave node 6 1332) corresponding to the location of the first vector chunks. The arrow 1336 represents a transition to a node state in which each node with first vector chunks run the block tasks 1334 (e.g., block tasks running in parallel 1350, 1352 and 1354). The block tasks 1334 apply the user-defined bloFunc function to each of the first vector chunk records to produce block function evaluation results for each of the first vector chunks. The block function evaluation results (e.g., VBC1 1360, VBC2 1362, and VBC3 1364) represent values for block function evaluation records (e.g., VBC1R1 1366, VBC2R1 1368, and VBC3R1 1370) that form new vector Z. The arrow 1358 represents a transition to a node state in which each node with first vector chunks includes corresponding block function evaluation results (e.g., VBC1 1360, VBC2 1362, and VBC3 1364) that are values for the block function evaluation records (e.g., VBC1R1 1366, VBC2R1 1368, and VBC3R1 1370) for vector Z. For example, the user-defined bloFunc function may count the number of records of each vector chunk of vector X 1372 to form the block function evaluation records of new vector Z 1374.

Table 2 illustrates how GridBatch may implement the user-defined bloFunc function to count the number of records in a partition (e.g., vector chunks). When the programmer implements the user-defined bloFunc function, as shown in Table 2, to be called recursively, the user-defined function implements a count partition algorithm. For example, the user-defined bloFunc function may accept an iterator of records of a vector chunk, count the number of records in the input iterator to obtain a block function evaluation result and generate a record (e.g., block function evaluation record) with the count value for vector Z.

TABLE 2

User-Defined Function for counting the number of records of a partition.

bloFunc(Iterator records) / list of records of a vector chunk /
   int count=0;
   for each record x in records
      count ++
   EmitResult(Vector Z, count)

The user-defined bloFunc function, as shown in Table 2, counts the number of records in the input Iterator and includes the count value as a record in vector Z. Each vector chunk produces a vector chunk record count value (e.g., block function evaluation result). In order to determine the overall count of the number of records in the vector, a recurse operator may be applied to sum up all the values (e.g., block function evaluation results) in the block function evaluation records of vector Z. The user-defined bloFunc function may be applied simultaneously to the vector chunks of a large file. In one implementation, vector chunks residing on the same node of a block may be processed sequentially. GridBatch may perform the partition operator and/or a distribute operator before performing the block operator to ensure that the vector chunk records are distributed as desired (e.g., based on the number of partitions, nodes and/or distribution of values for data of interest within each vector chunk record).

In one implementation, the block operator may be used to optimize the median computation. For example, the block operator may be used to perform the median computation in a data warehouse application for a large financial services firm. A company with tens of millions of customers may be interested in collecting and reporting high-level statistics regarding the average and median account balance of each customer. The statistics may be from across many different dimensions of the customer base of the company (e.g., across age groups 20-30 years old, 30-40 years old) and/or across industries (e.g., retail and high-tech industries). The company may be interested in a combination of many dimensions, such as across age groups within anyone industry, and/or across job tenure length within any one geographical area. In one implementation, the computation of such statistics involves a large fact table with tens of millions of rows, and each row holds all relevant information specific to a customer, including: the account balance; the birthday of the customer; industry; geography; job tenure length; and education. Computing an average simply requires summing up a total and dividing it by the count. However, computing a median is more complex, because computing median involves sequential processing. One approach is to sort all data and then find the middle point. Both steps are sequential in nature, and hence, they take a long time to complete for large data set. Computing median becomes more complex when there are a large number of median computations.

Enterprises today most commonly use a database to solve large-scale data warehousing application computations such as the median computation. For example, once a fact table is loaded into a database, a SQL statement is executed against the fact table to compute the 50 percentile value which is exactly the median. Although the SQL statement may be simple to write, segmenting the data before executing the query is complex. For example, computing the median for four age groups (e.g., 20 to 30 years old, 30 to 40 years old, 40-50 years old and 50 years old and above) rows corresponding to customers in the same age group must be grouped together before computing the median for each age group. One way to group the rows according to age groups is to include a condition (e.g., where clause) in the SELECT statement that specifies a range of dates for the birthday of customers so that the median can then be computed from the groups. However, four separate queries, one for each age group (e.g., 20 to 30 years old, 30 to 40 years old, 40-50 years old and 50 years old and above) may be required, and the data is processed in four passes where each pass reads the complete data set.

Another approach to computing the median for four age groups is to use a GROUP BY clause to group all rows in the same age bracket together. In order for GROUP BY to work, all rows in an age range must have a common column with the same value. One could use ETL (Extract, Transform, Load) tools to add an additional column (e.g., age group column), where the same age group value is assigned to all rows in the same age group. For example, rows representing customers between the ages of 20 and 30 years old may be assigned the age group value of 1, while rows representing customers between the ages of 30 to 40 years old may be assigned the age group value of 2. Such an approach requires a number of three passes, where the first pass reads the data set, the second pass writes the transformed data set with the additional column to a staging table and the third pass reads the data set for the GROUP BY query. However, the third pass has to be repeated for each age group. Minimizing the number of passes for large data sets is critical because reading and writing data to and from the database consume the most time.

Using the block operator, the median computation may be completed in two passes. In one implementation, the block operator uses three steps to calculate the median and minimize the number of passes (e.g., record reads and/or writes), network and local bandwidth usage.

In one implementation, the block operator logic 280 includes identifying split-points that represent ordered partitions of data. The split-points are identified to ensure that the vector chunk sizes are roughly evenly distributed to maximize parallelism. In the event the distribution is known for the values for which the median will be computed (e.g., distribution of account balances), the split-points may be identified. Alternatively, a pre-processing may be performed to collect a sample distribution of values of interest (e.g., account balances). GridBatch identifies split-points that ensure that each vector chunk is small enough to fit into the memory. The block operator supplies the input data as an Iterator to the user-defined function bloFunc.

GridBatch ensures that the vector chunk sizes are small enough in order to ensure that the bloFunc user-defined function can cache in memory all the data to be processed by the bloFunc user-defined function.

In one implementation, GridBatch computes one median (e.g., the median age of all customers) for an entire set of data according to the following 3 steps. Step 1, Gridbatch partitions the records into vector chunks such that the values of interest (e.g., the age of customers) used to compute the median are between two split-points within a given vector chunk. The bloFunc user-defined function iterates through all the data in a vector chunk to count the number of records in the vector chunk. Step 2, the counts for the vector chunks are aggregated. The rank of the median is determined based on the total from summing up the counts of the vector chunks. The vector chunk where the median is located and the rank of the median within that vector chunk is known, because the split-points identify a sequential ordering of vector chunks and thereby an ordered ranking of each value within each vector chunk. For example, where the median is determined to be in vector chunk c and rank r, where the rank r is the position in an ordered sequence of vector chunk records, the median is identified as the value of the vector chunk record at rank r. Step 3, the data in vector chunk c is sorted and then the $r^{th}$ number is identified, which is the median.

In order to determine multiple medians within a set of data (e.g., the median of each of multiple age groups—20 to 30 years old, 30 to 40 years old, 40-50 years old and 50 years old and above) a counter for each age group may be used. In steps 1 and 3 above, the counter for each age group is only incremented when the record belongs to the age group of that counter. GridBatch scans the data once in both steps 1 and 3, and the data is sorted once in step 3.

GridBatch computes the partition number once, and takes advantage of the partitioned data structure. The ability to pre-partition data enables GridBatch to provide huge performance gains. Increasing the number of medians increases the number of groups and group partition pairs that GridBatch uses to compute multiple medians. The amount of intermediate data processed by the block operator increases by the number of medians, which has similar consequence as increasing the number of rows.

Table 3 illustrates how GridBatch may implement the user-defined bloFunc function to compute the medians of multiple age brackets (e.g., the median of multiple age groups) within a partition. Table 3 illustrates that the list of records of vector X are of the same partition (e.g., vector chunk) so that the partition is identified once for all the records in the list of records.

TABLE 3

User-Defined Function for computing multiple medians.

```
bloFunc(list of records X) :
    p=partition(X)
    for each x in X
        for each bracket b
            if (x in b)
                cp,b ++        /** count of records in partition p for bracket b **/
    for each bracket b
        EmitResult(b;p, cp,b)
```

Table 4 illustrates how GridBatch may implement the user-defined bloFunc function to determine the values of multiple medians within a partition.

TABLE 4

User-Defined Function for determining the median.

```
bloFunc(list of records X):
    p = partition(X) /** p partition **/
    sort X by account balance
    for each bracket b /** b bracket **/
        if ( p == pb ) /** pb bracket of partition p **/
            find rb^th value in bracket b /** find the ranked value
                within bracket b **/
                                /** that corresponds to the median **/
            EmitResult(b, rb^th balance)
```

Figure 14:
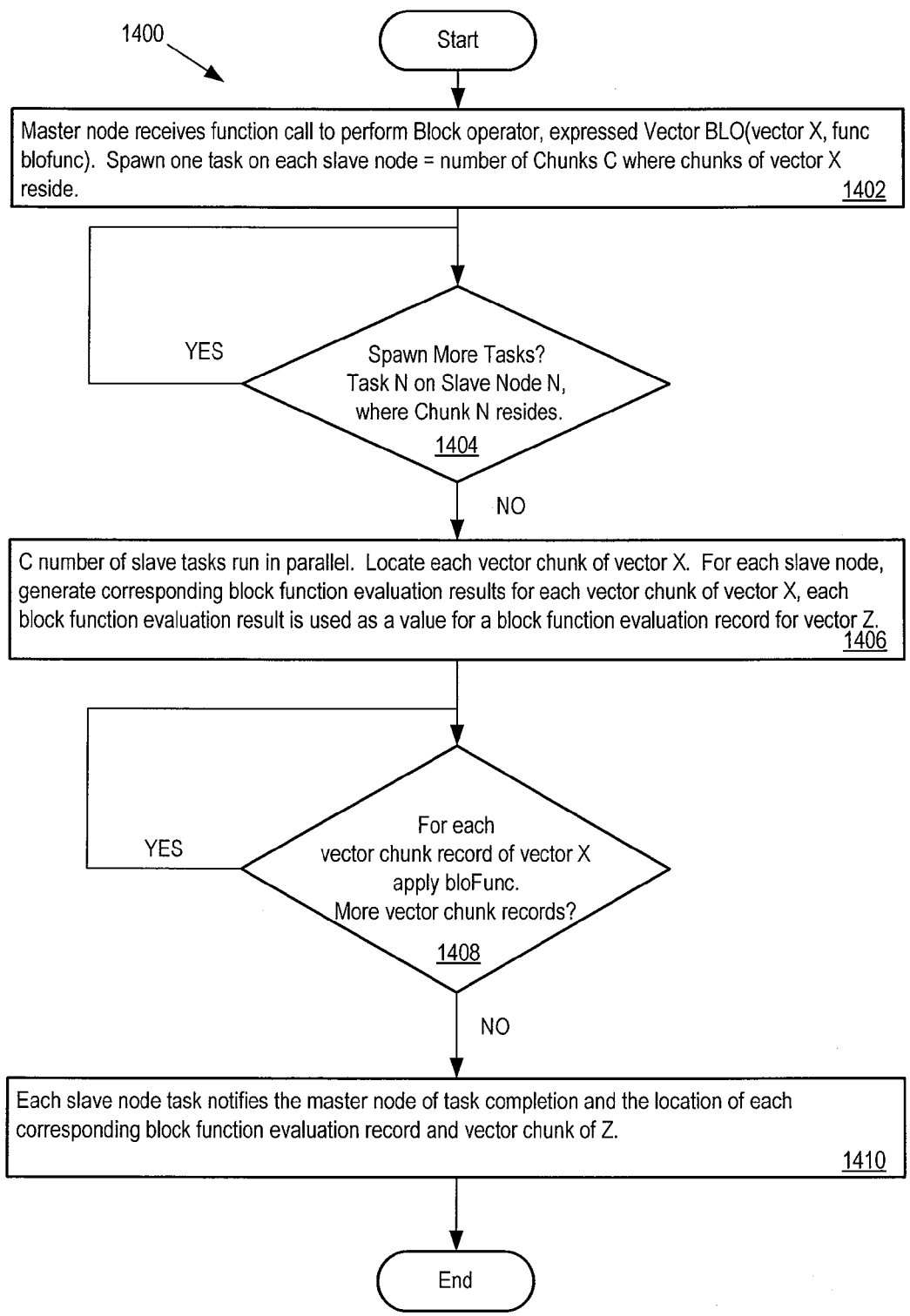
FIG. 14 shows the logic flow GridBatch 100 may take to perform the map operator.

FIG. 14 shows the logic flow GridBatch 100 may take to perform the block operator. The master node logic 260 receives the block function call 1400 to apply a user-defined bloFunc function (e.g., compute the number of record in a vector chunk) to the records of a vector chunk of vector X (1402). The master node logic 260 spawns slave tasks corresponding to each vector chunk of vector X (1404). Slave tasks invoke slave node logic 160 to locate each vector chunk of vector X assigned to corresponding slave nodes (1406). For each vector chunk of vector X, the slave node logic 160 applies the user-defined bloFunc to each vector chunk record to obtain the block function evaluation results (e.g., vector chunk record counts) for each vector chunk that form the block function evaluation records of vector Z (1408). Once the slave node logic 160 has applied the bloFunc to each vector chunk record of vector X, each slave task notifies the master node logic 260 of the completion status of the slave task and the location of the corresponding vector chunk of Z. The block operator successfully finishes when the slave nodes notify the master node that all slave tasks have finished (1410). The block function evaluation results (e.g., record counts of each vector chunk) of vector X are used as block function evaluation records for vector Z.

The additional operators that GridBatch provides yield unexpectedly good results for parallel programming techniques. In particular, each operator provides significant advantages over prior attempts at application parallelization. The unexpectedly good results include significant additional programming flexibility, efficiency, and applicability to extraordinarily difficult problems faced by modern businesses, particularly with enormous amounts of data that must be processed in a realistic timeframe to achieve meaningful results.

The MapReduce programming model implements a unitary programming construct. In particular, a Map function is always paired with a Reduce function. On the other hand, GridBatch provides multiple independent operators: Recurse, Convolution, Join, Distribute, Map, and Block that a programmer may use in virtually any order or sequence to build a complex application that executes in parallel across many nodes. Furthermore, the Gridbatch framework implements user defined functions specified for the independent operators through which the programmer may impart an immense degree of custom functionality. Such user defined functions include a partition function to determine how to break a vector into vector chunks, a hash function for distributing vector chunks among nodes, a join function for specifying how to combine records, a convolution function to support the join operator, a recurse function that specifies how to merge partial results of the recurse operator, a map function for application to records of a vector, and a block function that specifies how to apply operations to the records of a given partition.

Furthermore, it is noted that the system carries out electronic transformation of data that may represent underlying physical objects. For example, the master node logic, slave node logic and distribute operator logic transform, by selectively controlled distribution, a discrete task request into multiple highly distributed parallelized tasks. The master node logic, slave node logic, job scheduler logic, join operator logic, convolution operator logic, recurse operator logic, map operator logic and block operator transform the highly distributed parallelized tasks into discrete results. These discrete results may represent a wide variety of physical objects, including as examples only, images, video, financial statements (e.g., credit card, bank account, and mortgage statements), email messages, raw materials for manufacturing, finished goods and half-finished goods or any other physical object.

In addition, the system may be implemented as a particular machine. For example, the particular machine may include a CPU, GPU, and software library for carrying out the master node logic noted above. The particular machine may include a CPU and a GPU with the master node logic and slave node logic described above. Incorporating the user-defined functions described with the master node logic may include building function calls into applications from a software library that handles the scheduling, combining, converting, transposing, aggregating, mapping, and distribution logic noted above. However, the applications may be extended in other ways to cause interactions with the system.

A number of implementations have been described. Nevertheless, it will be understood that various modifications may be made without departing from the spirit and scope of the invention. Accordingly, other implementations are within the scope of the following claims.

What is claimed is:

1. A product comprising:
   a non-transitory machine readable medium;
   first operator logic stored on the medium and operable to:
      implement a first data processing operation in parallel over multiple processing nodes, the first data processing operation customized with a first user-defined function executed on the multiple processing nodes; and
   second operator logic stored on the medium and operable to:
      implement a second data processing operation in parallel over the multiple processing nodes, the second data processing operation customized with a second user-defined function executed on the multiple processing nodes; wherein the first and/or second operator logic comprises block operator logic; wherein the block operator logic is customized with a user-defined block function; and wherein the block operator logic is operable to apply the user-defined block function to a plurality of records of a first vector.

2. The product of claim 1, further comprising:
file system manager logic stored on the medium, and operable to assign vector chunks of the first vector among the multiple processing nodes according to a user-defined hash function.

3. The product of claim 2, wherein the file system manager logic is further operable to provide vector chunk node location information for the vector chunks to a job scheduler.

4. The product of claim 2, wherein the file system manager logic is further operable to reshuffle the vector chunks.

5. The product of claim 2, wherein the file system manager logic is further operable to:
maintain a mapping of chunk IDs to the multiple processing nodes that identifies each chunk ID data node assignment; and
reshuffle the vector chunks when the mapping changes.

6. The product of claim 1, wherein the first or second operator logic comprises join operator logic; wherein the first or second user-defined function comprises a user-defined join function; and wherein the join operator logic is operable to invoke the user-defined join function on a first matching record in the first vector and a second matching record in a second vector distributed among the multiple processing nodes when a join index field present in the first vector and the second vector matches for the first matching record and the second matching record, to obtain a join result.

7. The product of claim 6, further comprising:
master node logic stored on the medium and operable to:
receive a join function call; and
initiate spawning of joining tasks locally among the multiple processing nodes, each joining task operable to selectively initiate execution of the user-defined join function.

8. The product of claim 1, wherein the first or second operator logic comprises recurse operator logic; wherein the first or second user-defined function comprises a user-defined recurse function; and wherein the recurse operator logic is operable to invoke the user-defined recurse function starting over the vector chunks locally on the multiple processing nodes to produce intermediate results, communicate a subset of the intermediate results to a subset of the multiple processing nodes, and iterate:
invocation of the user-defined recurse function on the intermediate results to produce increasingly fewer intermediate results; and
communication of a subset of the increasingly fewer intermediate results to an increasingly smaller subset of the multiple processing nodes; until a final recurse result is obtained over the first vector on a final node in the first set of nodes.

9. The product of claim 8, further comprising:
master node logic stored on the medium and operable to:
receive a recurse function call; and
initiate spawning of recurse operation tasks locally among the multiple processing nodes, each recurse operation task operable to selectively initiate execution of the user-defined recurse function to the vector chunks.

10. The product of claim 1, wherein the first or second operator logic comprises convolution operator logic; wherein the first or second user-defined function comprises a user-defined convolution function; and wherein the convolution operator logic is operable to invoke the user-defined convolution function for each record in the first vector on every record in a second vector, to obtain a convolution function result.

11. The product of claim 10, further comprising master node logic stored on the medium and operable to:
receive a convolution function call; and
initiate spawning of convolution operation tasks locally among the multiple processing nodes, each convolution operation task operable to selectively initiate execution of the user-defined convolution function.

12. The product of claim 1, wherein the first or second operator logic comprises distribute operator logic; wherein the first or second user-defined function comprises a user-defined partition function; and wherein the distribute operator logic is operable to redistribute, according to the user-defined partition function, a first vector previously distributed as first vector chunks among the multiple processing nodes, to obtain redistributed vector chunks of the first vector redistributed among the multiple processing nodes.

13. The product of claim 1, wherein the first or second operator logic comprises map operator logic; wherein the first or second user-defined function comprises a user-defined map function; and wherein the map operator logic is operable to apply the user-defined map function to the records of a second vector distributed among the multiple processing nodes.

14. A method for processing data in parallel comprising:
initiating execution of a first data processing operation in parallel over multiple processing nodes, the first data processing operation customized with a first user-defined function executed on the multiple processing nodes; and
initiating execution of a second data processing operation in parallel over the multiple processing nodes, the second data processing operation customized with a second user-defined function executed on the multiple processing nodes; wherein the first and/or second data processing operation comprises block operator logic; wherein the block operator logic is customized with user-defined block function; and wherein the block operator logic applies the user-defined block function to a plurality of records of a first vector.

15. The method of claim 14, further comprising assigning vector chunks of the first vector among the multiple processing nodes according to a user-defined hash function.

16. The method of claim 14, further comprising providing vector chunk node location information for the vector chunks to a job scheduler.

17. The method of claim 14, further comprising reshuffling the vector chunks.

18. The method of claim 14, wherein the first or second data operations processing operation comprises join operator logic.

19. The method of claim 18, further comprising:
receiving a join function call; and
initiating spawning of joining tasks locally among the multiple processing nodes, each joining task operable to selectively initiate execution of the user-defined join function.

20. The method of claim 14, wherein the first or second data operations processing operation comprises recurse operator logic; wherein the first or second user-defined function comprises a user-defined recurse function; and wherein the recurse operator logic invokes the user-defined recurse function starting over vector chunks locally on the multiple processing nodes to produce intermediate results, communicate a subset of the intermediate results to a subset of the multiple processing nodes, and iterate:

invocation of the user-defined recurse function on the intermediate results to produce increasingly fewer intermediate results; and communication of a subset of the increasingly fewer intermediate results to an increasingly smaller subset of the multiple processing nodes; until a final recurse result is obtained over the first vector on a final node in the first set of nodes.

21. The method of claim 20, further comprising:
receiving a recurse function call; and
initiating spawning of recurse operation tasks locally among the multiple processing nodes, each recurse operation task operable to selectively initiate execution of the user-defined recurse function to the vector chunks.

22. The method of claim 14, wherein the first or second data operations processing operation comprises convolution operator logic; wherein the first or second user-defined function comprises a user-defined convolution function; and wherein the convolution operator logic invokes the user-defined convolution function for each record in the first vector on every record in a second vector, to obtain a convolution function result.

23. The method of claim 22, further comprising:
receiving a convolution function call; and
initiating spawning of convolution operation tasks locally among the multiple processing nodes, each convolution operation task operable to selectively initiate execution of the user-defined convolution function.

24. The method of claim 14, wherein the first or second data operations processing operation comprises distribute operator logic; wherein the first or second user-defined function comprises a user-defined partition function; and wherein the distribute operator logic redistributes, according to the user-defined partition function, the first vector previously distributed as first vector chunks among the multiple processing nodes, to obtain redistributed vector chunks of the first vector redistributed among the multiple processing nodes.

25. The method of claim 14, wherein the first or second data operations processing operation comprises map operator logic; wherein the first or second user-defined function comprises a user-defined map function; and wherein the map operator logic applies the user-defined map function to records of a vector distributed among the multiple processing nodes.

* * * * *